(12) United States Patent
Matsumura et al.

(10) Patent No.: US 12,015,746 B2
(45) Date of Patent: Jun. 18, 2024

(54) IMAGE PROCESSING SYSTEM, SETTING CONTROL METHOD, IMAGE PROCESSING APPARATUS, AND STORAGE MEDIUM

(71) Applicant: CANON KABUSHIKI KAISHA, Tokyo (JP)

(72) Inventors: Takeshi Matsumura, Chiba (JP); Toru Takahashi, Chiba (JP); Yuji Naya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/303,070

(22) Filed: Apr. 19, 2023

(65) Prior Publication Data

US 2023/0254421 A1 Aug. 10, 2023

Related U.S. Application Data

(63) Continuation of application No. 17/093,843, filed on Nov. 10, 2020, now Pat. No. 11,665,293.

(30) Foreign Application Priority Data

Nov. 20, 2019 (JP) .................................. 2019-209827

(51) Int. Cl.
*G10L 15/22* (2006.01)
*H04N 1/00* (2006.01)

(52) U.S. Cl.
CPC ......... *H04N 1/00403* (2013.01); *G10L 15/22* (2013.01); *H04N 1/00514* (2013.01);
(Continued)

(58) Field of Classification Search
CPC . H04N 1/00403; H04N 1/00517; G10L 15/22
See application file for complete search history.

(56) References Cited

U.S. PATENT DOCUMENTS

| 10,868,929 B2 | 12/2020 | Ishida |
| 11,120,787 B2 | 9/2021 | Kitaguchi |
| 2020/0177745 A1* | 6/2020 | Ishida ..................... G10L 15/26 |

FOREIGN PATENT DOCUMENTS

| JP | H0990818 A | 4/1997 |
| JP | 2007114297 A | 5/2007 |

(Continued)

OTHER PUBLICATIONS

Non-Final Office Action issued in U.S. Appl. No. 17/093,843 mailed Aug. 15, 2022.
(Continued)

*Primary Examiner* — Ibrahim Siddo
(74) *Attorney, Agent, or Firm* — ROSSI, KIMMS & McDOWELL LLP

(57) ABSTRACT

There is provided an image processing system including: an image processing device; a microphone that is capable of acquiring speech; a retaining unit configured to retain, in a history database, setting values for image processing utilized in the past; an acquiring unit configured to acquire, based at least on that a specific word has been recognized in a result of speech recognition on speech acquired by the microphone, one or more setting values from the history database using an extraction condition corresponding to the specific word, and a setting unit configured to set up a new job to be executed by the image processing device based on the one or more setting values.

14 Claims, 23 Drawing Sheets

(52) U.S. Cl.
CPC ....... *H04N 1/00517* (2013.01); *H04N 1/0097* (2013.01); *G10L 2015/223* (2013.01)

(56) References Cited

FOREIGN PATENT DOCUMENTS

| | | |
|---|---|---|
| JP | 2018046416 A | 3/2018 |
| JP | 2019096295 A | 6/2019 |
| JP | 2019153146 A | 9/2019 |
| JP | 2019205052 A | 11/2019 |
| JP | 2020087359 A | 6/2020 |

OTHER PUBLICATIONS

Final Office Action issued in U.S. Appl. No. 17/093,843 mailed Oct. 19, 2022.
Notice of Allowance issued in U.S. Appl. No. 17/093,843 mailed Feb. 10, 2023.

* cited by examiner

FIG. 8

| INTENT ID | UTTERANCE |
|---|---|
| Copy_simple | Make a {CopyOperation} |
| | Want to have a {CopyOperation} |
| | Start {CopyOperation} |
| | {ScanOperation} and {PrintOperation} |
| | {PrintOperation} {ScanOperation} image |
| Copy_with_noc | Make [NUMBER] {CopyOperation} |
| | Want to have [NUMBER] {CopyOperation} |
| | {ScanOperation} and make [NUMBER] {PrintOperation} |
| | Make [NUMBER] {PrintOperation} of {ScanOperation} image |
| Copy_with_2_settings | Make [NUMBER] {CopyOperation} in {ColorMode} |
| | Want to have [NUMBER] {CopyOperation} in {ColorMode} |
| | Make [NUMBER] {CopyOperation} in {PaperSide} |
| | Want to have [NUMBER] {CopyOperation} in {PaperSide} |
| | Make a {CopyOperation} in {PaperSide} and {ColorMode} |
| | Want to have a {CopyOperation} in {PaperSide} and {ColorMode} |
| Send_simple | Make {SendOperation} {PaperType} |
| | Want to {SendOperation} |
| | {ScanOperation} and {SendOperation} |
| | {ScanOperation} {PaperType} and {SendOperation} |
| Print_Simple | {PrintOperation} |
| | Want to {PrintOperation} |
| | Start {PrintOperation} |
| | {PrintOperation} entered job |
| | Make {Quantity} {PrintOperation} of entered job |

FIG. 9

| INTENT ID | UTTERANCE |
|---|---|
| Copy_history1 | Make a {CopyOperation} with {Timing} settings |
| | Want to have a {CopyOperation} with {Timing} settings |
| | : |
| Copy_history2 | Make a {CopyOperation} with {Frequency} settings |
| | Want to have a {CopyOperation} with {Frequency} settings |
| | : |
| Send_History1 | {SendOperation} with {Timing} settings |
| | Use {Timing} settings to {SendOperation} |
| | : |
| Send_History2 | {SendOperation} with {Frequency} settings |
| | Use {Frequency} settings to {SendOperation} |
| | : |
| Send_History3 | {SendOperation} with {Frequency} settings to {Address_LastName} |
| | Use {Frequency} settings to {SendOperation} to {Address_LastName} |
| | : |
| Print_History1 | {PrintOperation} again {Timing} file |
| | : |
| Print_History2 | {PrintOperation} with {Timing} settings |
| | Use {Timing} settings to {PrintOperation} |
| | : |
| Print_History3 | {PrintOperation} with {Frequency} settings |
| | Use {Frequency} settings to {PrintOperation} |
| | : |
| Recommend_Setting | Want to have a {PrintOperation} with suitable settings for presentation |
| | Want to have {Number} {PrintOperation} with suitable settings for presentation |
| | Want to have a {PrintOperation} with suitable settings for meeting |
| | Want to have {Number} {PrintOperation} with suitable settings for meeting |
| | : |

FIG. 10

| ENTITY ID | VALUE ID | VALUE SYNONYMS |
|---|---|---|
| FREE_WORD | | |
| NUMBER | | Zero<br>One<br>Two<br>⋮ |
| Quantity | on_00000 | All<br>Whole |
| | on_00001 | One<br>Single |
| | on_00002 | Two<br>Double |
| | on_00003 | Three<br>Triple |
| OneAlphabet | chr_00000 | a |
| | chr_00001 | b |
| | chr_00002 | c |
| | ⋮ | ⋮ |
| Color | col_00000 | Red |
| | col_00001 | Green |
| | col_00002 | Blue |
| | col_00003 | Yellow |
| | ⋮ | ⋮ |
| ColorMode | cm_00000 | Grayscale |
| | cm_00001 | Black and White<br>Monochrome |
| | ⋮ | ⋮ |
| | cm_00005 | Full-Color<br>Color |
| CopyOperation | copy_00000 | Copy<br>Copies<br>Replication<br>Replications |
| PrintOperation | print_00000 | Print<br>Prints |
| ScanOperation | scan_00000 | Scan<br>Read |
| StoreOperation | store_00000 | Store<br>Save |
| SendOperation | send_00000 | Send<br>Transmit<br>Forward |

FIG. 11

| ENTITY ID | VALUE ID | VALUE SYNONYMS |
|---|---|---|
| PaperSize | psize_00000 | A3 |
| | psize_00001 | A4 |
| | psize_00002 | A5 |
| | psize_00003 | B4 |
| PaperType | ptype_00000 | OHP Sheet<br>Foil<br>Transparent Film |
| | ptype_00001 | Regular Paper |
| | ptype_00002 | Recycled Paper |
| PaperSide | pside_00000 | One Side<br>Single Side |
| | pside_00001 | Both Side<br>Double Side |
| | pside_00002 | Top and Bottom |
| Position | pos_00000 | Top |
| | pos_00001 | Top Right |
| | pos_00002 | Right |
| | ⋮ | ⋮ |
| | pos_00011 | Right and Left<br>Left and Right |
| Direction | dir_00000 | Vertical |
| | dir_00001 | Horizontal |
| | dir_00010 | Short Side<br>Shorter Side |
| | dir_00011 | Long Side<br>Longer Side |
| | dir_00020 | Portrait |
| | dir_00021 | Landscape |

FIG. 12

| ENTITY ID | VALUE ID | VALUE SYNONYMS |
|---|---|---|
| Address_LastName | lastname_00000 | Sato |
| | lastname_00001 | Suzuki |
| | lastname_00002 | Takahashi |
| | : | : |
| Address_FirstName | firstname_00000 | Ichiro |
| | firstname_00001 | Jiro |
| | firstname_00002 | Saburo |
| | : | : |
| Address_NameTitle | nametitle_00000 | Mr. |
| | nametitle_00001 | Ms. |
| | nametitle_00002 | Miss. |
| | nametitle_00003 | Dr. |
| | : | : |
| Finishing | fin_00000 | Staple |
| | fin_00001 | Punch |
| | fin_00002 | Fold |
| Timing | timing_00000 | Today |
| | timing_00001 | Yesterday |
| | timing_00002 | Day Before Yesterday |
| | timing_00003 | Previous Last Time |
| Frequency | freq_00000 | Every Time Regular |
| | freq_00001 | Frequently-Used Usual |
| Change | change_00000 | The Same Similar No Change |
| | change_00001 | Small Scale Down Shrink |
| | change_00002 | Large Scale Up Enlarge |
| | change_00003 | Strongly Intensely |
| | change_00004 | Weakly Thinly |

FIG. 13A

```
                                    ~231
{
  "Intent ID" : "Copy_with_noc",
  "Entities" : [
    {
      "Entity ID" : "NUMBER",
      "Value ID" : "3"
    },
    {
      "Entity ID" : "CopyOperation",
      "Value ID" : "copy_00000"
    }
  ]
}
```

FIG. 13B

```
                                    ~232
{
  "Intent ID" : "Send_history1",
  "Entities" : [
    {
      "Entity ID" : "Timing",
      "Value ID" : "timing_00001"
    },
    {
      "Entity ID" : "SendOperation",
      "Value ID" : "send_00000"
    }
  ]
}
```

FIG. 13C

```
                                    ~233
{
  "Intent ID" : "Copy_history2",
  "Entities" : [
    {
      "Entity ID" : "Frequency",
      "Value ID" : "freq_00001"
    },
    {
      "Entity ID" : "CopyOperation",
      "Value ID" : "copy_00000"
    }
  ]
}
```

FIG. 13D

```
                                    ~234
{
  "Intent ID" : "Recommend_setting",
  "Entities" : [
    {
      "Entity ID" : "NUMBER",
      "Value ID" : "4"
    },
    {
      "Entity ID" : "PrintOperation",
      "Value ID" : "print_00000"
    }
  ]
}
```

| | ATTRIBUTE NAME | DESCRIPTION | VALUE SAMPLE |
|---|---|---|---|
| 1401 | Owner | User Who Issued the Job | Sato/UID:000001 |
| 1402 | Group | Assigned Group | GID:000002 |
| 1403 | date_time | Date and Time When the Job was Created | 43678 |
| 1404 | type | Type of the Job | Copy |
| 1405 | Job ID | Identifier of the Job | 2019/8/1-000010 |
| | Detail Parameters | | |
| | scan_job_parameters | | |
| | destination | Transmission Destination | |
| | name | Name of Transmission Dest. | - |
| | mail_address | Mail Address of Transmission Dest. | - |
| | preview | Requires Preview or Not | FALSE |
| | scan_density_level | Scan Density Level | 3 |
| 1410 | mail_contents | | |
| | subject | Text in Subject Field | - |
| | Body | Text in Mail Body | - |
| | image_file_format | Image File Format | - |
| | scan_sides | Single Side/Double Side | TwoSidedLeftRight |
| | scan_size | Scan Size | Auto |
| | ColorMode | Color/Monochrome | Color |
| | Print Job Parameters | | |
| | NomOfPrint | Number of Copies to Print | 10 |
| | PaperSize | Print Paper Size | Auto |
| 1420 | Print_sides | Single Side/Double Side | TwoSidedLeftRight |
| | document_format | File Type of Target Document | - |
| | ColorMode | Color/Monochrome | Color |

FIG. 15A

| ATTRIBUTE NAME | REUSE ALLOWED |
|---|---|
| scan_job_parameters | |
| destination | |
| name | NO |
| mail_address | NO |
| preview | YES |
| scan_density_level | YES |
| mail_contents | |
| subject | NO |
| Body | NO |
| image_file_format | YES |
| scan_sides | YES |
| scan_size | YES |
| ColorMode | YES |
| Print Job Parameters | |
| NomOfPrint | YES |
| PaperSize | YES |
| Print_sides | YES |
| document_format | — |
| ColorMode | YES |

1410: rows from scan_job_parameters through ColorMode
1420: rows from Print Job Parameters through ColorMode

F I G. 15B

| ATTRIBUTE NAME | REUSE ALLOWED ||||
| --- | --- | --- | --- | --- |
|  | PRINT | SEND | SCAN | COPY |
| scan_job_parameters |  |  |  |  |
|   destination |  |  |  |  |
|     name |  | NO | NO |  |
|     mail_address |  | NO | NO |  |
|   preview |  | NO | NO |  |
|   scan_density_level |  | YES | YES |  |
|   mail_contents |  |  |  |  |
|     subject |  | NO | NO |  |
|     Body |  | NO | NO |  |
|   image_file_format |  | YES | YES |  |
|   scan_sides |  | YES | YES | YES |
|   scan_size |  | NO | NO | NO |
|   ColorMode |  | YES | YES | YES |
| Print Job Parameters |  |  |  |  |
|   NomOfPrint | YES |  |  | YES |
|   PaperSize | YES |  |  | YES |
|   Print_sides | YES |  |  | YES |
|   document_format | — |  |  | — |
|   ColorMode | YES |  |  | — |

1410 = scan_job_parameters group
1420 = Print Job Parameters group

FIG. 16

| ATTRIBUTE NAME | SEARCH KEY(S) | | | |
|---|---|---|---|---|
| | PRINT | SEND | SCAN | COPY |
| 1401 — Owner | (K) | (K) | (K) | (K) |
| 1402 — Group | (K) | (K) | (K) | (K) |
| 1403 — date_time | (K) | (K) | (K) | (K) |
| 1404 — type | K | K | K | K |
| 1405 — Job ID | | | | |
| Detail Parameters | | | | |
| 1410 { scan_job_parameters | | | | |
|   destination | | | | |
|     name | | | | |
|     mail_address | | (K) | | |
|   preview | | | | |
|   scan_density_level | | | | |
|   mail_contents | | | | |
|     subject | | | | |
|     Body | | | | |
|   image_file_format | | | | |
|   scan_sides | | | | |
|   scan_size | | | | |
|   ColorMode | | | | |
| 1420 { Print Job Parameters | | | | |
|   NomOfPrint | | | | |
|   PaperSize | | | | |
|   Print_sides | | | | |
|   document_format | (K) | | | |
|   ColorMode | | | | |

IMAGE PROCESSING SYSTEM, SETTING CONTROL METHOD, IMAGE PROCESSING APPARATUS, AND STORAGE MEDIUM

BACKGROUND OF THE INVENTION

Field of the Invention

The present disclosure relates to an image processing system, a setting control method, an image processing apparatus, and a storage medium.

Description of the Related Art

An apparatus such as an image forming apparatus that forms an image on a sheet and an image reading apparatus that reads an original executes a job in accordance with a user input detected via a user interface. In this manner, an operation of the apparatus as intended by the user is realized. However, along with improvement of processable image quality, the multi-functionality of the apparatus is advancing year by year, and the number of setting items of a job is accordingly increasing. The increase in number of setting items complicates understanding and the operation of the user with respect to a setting method for the apparatus, thereby imposing an excessive burden on the user.

As a technique for allowing a user to interact with a system with a small burden, there is known a user interface based on speech recognition (also referred to as a speech UI hereinafter). For example, Japanese Patent Laid-Open No. 2007-114297 proposed a technique to accept registration of auditory names of various operation keys of an image forming apparatus from a user in advance, and execute an action of an operation key corresponding to an auditory name recognized from an input speech of a user. According to the technique of Japanese Patent Laid-Open No. 2007-114297, for example, a user can assign a specific soft key to a set of settings for a copy operation and register an auditory name of the soft key on the apparatus so that the user can invoke the same set of settings only by uttering the auditory name.

SUMMARY OF THE INVENTION

According to technique proposed by Japanese Patent Laid-Open No. 2007-114297, the set of settings cannot be invoked later unless a user performs operation in advance for assigning a specific key to the set of setting to be used in the future. However, settings of a machine that are convenient to a user are not necessarily fixed and might not be predictable in advance. Hence, imposing an operation for assigning a key to a set of settings in advance on a user would rather increase the user's burden and cause the user to hesitate to utilize the speech UI. When the user does not perform the operation for assigning, the user needs to utter all of contents of many setting items to communicate desired settings to the machine with the speech UI, or to utilize a GUI that has become complicated due to the multi-functionality.

It is, therefore, desired to provide a mechanism for mitigating the burden on the user related to settings of a multifunctional machine.

According to one aspect, there is provided an image processing system including: an image processing device; a microphone that is capable of acquiring speech; a retaining unit configured to retain, in a history database, setting values for image processing utilized in the past; an acquiring unit configured to acquire, based at least on that a specific word has been recognized in a result of speech recognition on speech acquired by the microphone, one or more setting values from the history database using an extraction condition corresponding to the specific word, and a setting unit configured to set up a new job to be executed by the image processing device based on the one or more setting values. A corresponding method, image processing apparatus, and storage medium are also provided.

Further features of the present invention will become apparent from the following description of exemplary embodiments (with reference to the attached drawings).

BRIEF DESCRIPTION OF THE DRAWINGS

FIG. 8 is the first explanatory view showing an example of an intent list;

FIG. 9 is the second explanatory view showing an example of the intent list;

FIG. 10 is the first explanatory view showing an example of an entity list;

FIG. 11 is the second explanatory view showing an example of the entity list;

FIG. 12 is the third explanatory view showing an example of the entity list;

FIG. 13A is an explanatory view showing an example of intent data according to an embodiment;

FIG. 13B is an explanatory view showing another example of the intent data according to an embodiment;

FIG. 13C is an explanatory view showing another example of the intent data according to an embodiment;

FIG. 13D is an explanatory view showing another example of the intent data according to an embodiment;

FIG. 14 is an explanatory view showing an example of a configuration of history data according to an embodiment;

FIG. 15A is an explanatory view for describing an example of definition of setting items that are allowed to be set from the history data;

FIG. 15B is an explanatory view for describing another example of definition of setting items that are allowed to be set from the history data;

FIG. 16 is an explanatory view for describing an example of search keys when referring to entries in the history data;

DESCRIPTION OF THE EMBODIMENTS

Figure 1:
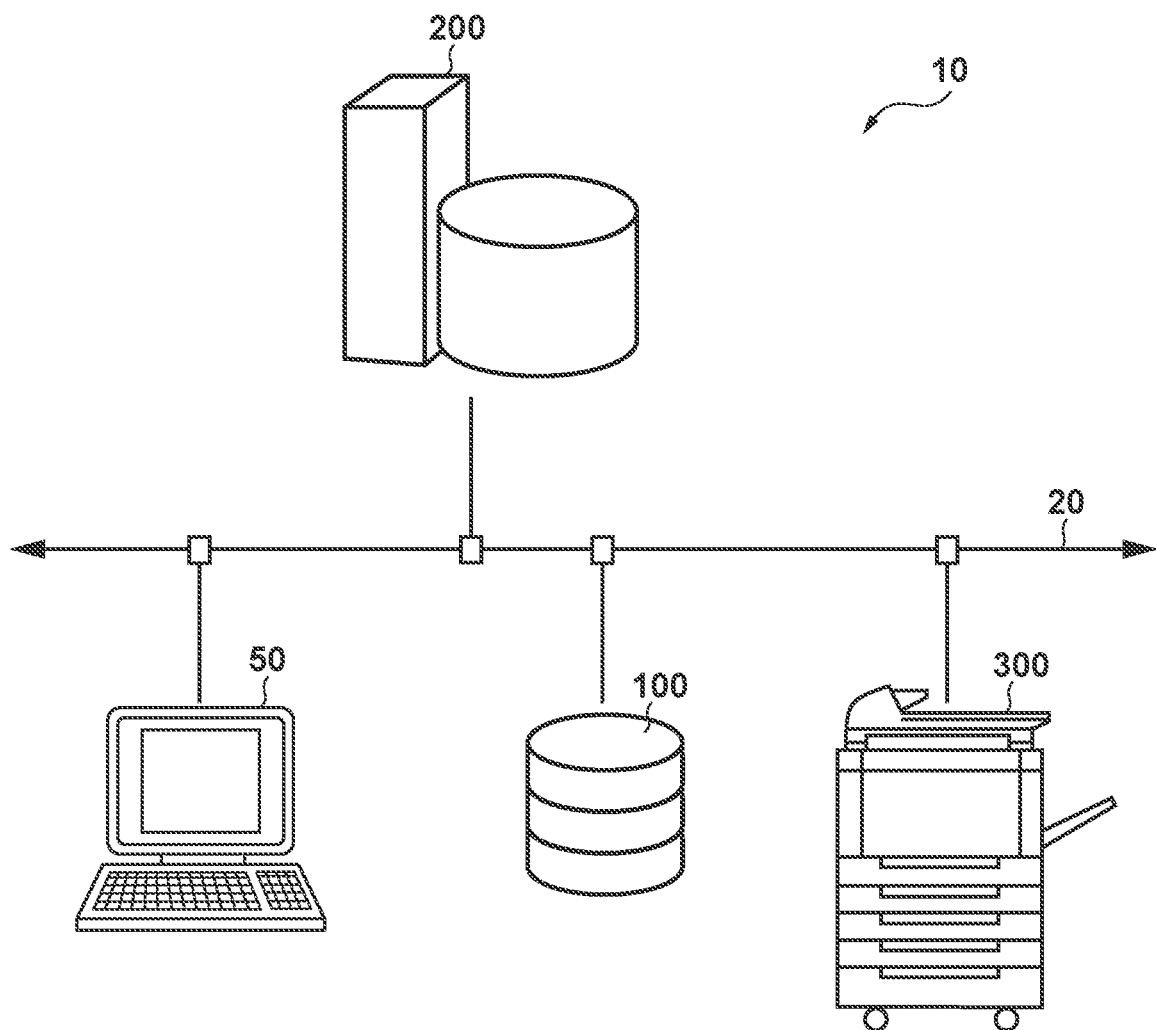
FIG. 1 is a schematic view showing an example of a configuration of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Example of Configuration of System 1-1. Overview of System

FIG. 1 is a schematic view showing an example of the configuration of a speech control system 10 according to an embodiment. Referring to FIG. 1, the speech control system 10 includes a client terminal 50, a speech control apparatus 100, a speech recognition server 200, and an image processing apparatus 300. FIG. 1 shows an example in which there exist one client terminal 50, one speech control apparatus 100, one speech recognition server 200, and one image processing apparatus 300, but the speech control system 10 may include more apparatuses and servers.

A network 20 is a communication network that interconnects the client terminal 50, the speech control apparatus 100, the speech recognition server 200, and the image processing apparatus 300. The network 20 may be either a wired network or a wireless network. The network 20 may be, for example, the Internet, a LAN (Local Area Network), a WAN (Wide Area Network), a cellular network, or an arbitrary combination thereof. The network 20 may include one or more network apparatuses such as a router, gateway, proxy server, and wireless LAN access point (none are shown).

The client terminal 50 is a terminal apparatus used by a user of the speech control system 10. The client terminal 50 may be, for example, a general-purpose information terminal such as a PC (Personal Computer) or a smartphone, or a dedicated terminal specialized for a specific business purpose. The client terminal 50 may be used to, for example, issue a print job for causing the image processing apparatus 300 to print electronic data, or to receive read image data generated by reading an original in the image processing apparatus 300.

The speech control apparatus 100 is an apparatus that controls acquisition of an input speech of the user and output of a response speech from the speech control system 10 to the user. The speech control apparatus 100 may be, for example, an independent apparatus for speech input/output such as a smart speaker. The speech control apparatus 100 may also be an information terminal having an agent function for speech input/output, similar to the client terminal 50. The function of the speech control apparatus 100 to be described in this specification may be integrated in the image processing apparatus 300. When a start of speech interaction is instructed, the speech control apparatus 100 acquires an input speech of the user via a microphone to generate input speech data, and transmits the input speech data (after encoding as necessary) to the speech recognition server 200. Furthermore, the speech control apparatus 100 reproduces response speech data received from the speech recognition server 200 (after decoding as necessary) to output a response speech via a speaker.

The speech recognition server 200 is a server apparatus that performs speech recognition of the input speech and synthesis of the response speech. The speech recognition server 200 may be an information processing apparatus such as a computer or a workstation. The speech recognition server 200 recognizes the input speech represented by the speech data received from the speech control apparatus 100 to interpret the user's intent. Then, if it is determined that the user intends to operate the image processing apparatus 300, the speech recognition server 200 transmits data (referred to as intent data hereinafter) representing the user's intent to the image processing apparatus 300. Furthermore, the speech recognition server 200 synthesizes the response speech data based on response text data received from the image processing apparatus 300, and transmits the response speech data to the speech control apparatus 100.

The image processing apparatus 300 is, for example, an apparatus having at least one of an image forming (print) function and an image reading (scan) function. Examples of the image processing apparatus 300 can include a copy machine, a digital scanner, a printer, a facsimile transmitter, and a multifunctional peripheral having two or more functions of the above apparatuses. The image forming function of the image processing apparatus 300 forms an image on a sheet in accordance with, for example, a print job received from the client terminal 50. The original reading function generates image data by reading an original placed on an original platen or set in an ADF (Auto-Document Feeder), for example, and transmits the generated image data to the client terminal 50. Note that the image processing apparatus 300 is not limited to the above-described example, and may be an arbitrary kind of apparatus that processes an image like an image capturing apparatus.

1-2. Arrangement of Each Apparatus (1) Speech Control Apparatus

Figure 2:
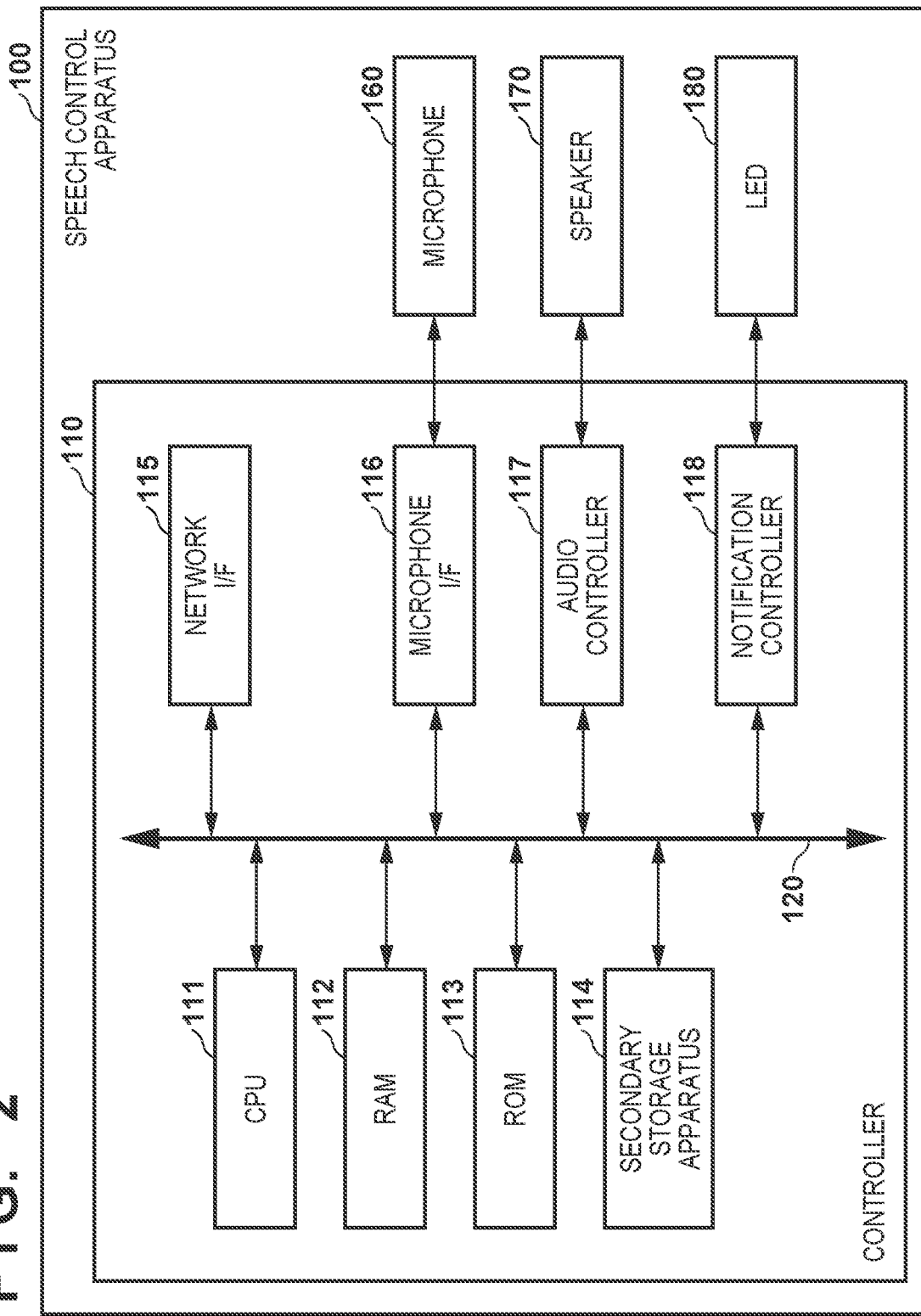
FIG. 2 is a block diagram showing an example of a physical arrangement of a speech control apparatus according to an embodiment.

FIG. 2 is a block diagram showing an example of a physical arrangement of the speech control apparatus 100 according to this embodiment. Referring to FIG. 2, the speech control apparatus 100 includes a controller 110, a microphone 160, a speaker 170, and an LED 180. The controller 110 includes a CPU 111, a RAM 112, a ROM 113, a secondary storage apparatus 114, a network I/F 115, a microphone I/F 116, an audio controller 117, and a notification controller 118. An internal bus 120 is a signal line that interconnects the CPU 111, the RAM 112, the ROM 113, the secondary storage apparatus 114, the network I/F 115, the microphone I/F 116, the audio controller 117, and the notification controller 118.

The CPU (Central Processing Unit) 111 is a processor that controls the overall operation of the speech control apparatus 100. The control function of the CPU 111 can be implemented by, for example, executing a computer program stored in advance in the ROM 113 or the secondary storage apparatus 114 and loaded into the RAM 112. The computer program may be downloaded from the outside of the speech control apparatus 100. The RAM (Random Access Memory) 112 is a volatile memory, and provides a temporary work memory area to the CPU 111. The ROM (Read Only Memory) 113 is a nonvolatile memory, and stores, for example, a boot program for activating the speech control apparatus 100. The secondary storage apparatus 114 is an auxiliary storage device that provides a large memory area, as compared with the RAM 112 and the ROM 113. The secondary storage apparatus 114 may include a detachable storage medium like, for example, an SD card. The network interface (I/F) 115 is a communication interface for communication with another apparatus by the speech control apparatus 100. The network I/F 115 may wirelessly transmit/receive data in accordance with a wireless communication standard such as Wi-Fi or Bluetooth®, or may transmit/receive data via a cable in accordance with a wired communication standard such as Ethernet®. For wireless communication, the network I/F 115 may include an antenna, an RF (Radio Frequency) circuit, and a baseband circuit.

The microphone I/F 116 is a connection interface for connecting the controller 110 to the microphone 160. The microphone 160 is a device for acquiring a speech in an environment where the speech control apparatus 100 is placed. The microphone 160 may be, for example, an ECM (Electret Condenser Microphones) or MEMS (Micro-Electrical-Mechanical Systems) microphone. The MEMS microphone is highly reliable and is small in size, and is thus widely adopted in a terminal apparatus such as a smartphone. FIG. 2 shows an example in which the speech control apparatus 100 includes one microphone 160. However, the speech control apparatus 100 may include, for example, three or more microphones at different positions in order to estimate the incoming direction of an input speech. This embodiment is not limited to a specific type of microphone or a specific number of microphones. For example, the microphone 160 acquires an input speech uttered by the user, and outputs a speech signal representing the acquired speech to the controller 110 via the microphone I/F 116. The microphone I/F 116 generates input speech data by encoding the speech signal, and writes the input speech data in the RAM 112 under the control of the CPU 111.

The audio controller 117 is a controller that is connected to the speaker 170 and controls the output of speech by the speech control apparatus 100 via the speaker 170. The speaker 170 is a device for outputting (or reproducing) speech. FIG. 2 shows an example in which the speech control apparatus 100 includes one speaker 170. However, the speech control apparatus 100 may include, for example, two or more speakers to output a directional speech. This embodiment is not limited to a specific type of speaker or a specific number of speakers. Under the control of the CPU 111, the audio controller 117 generates an analog speech signal by decoding output speech data (for example, response speech data), and outputs the speech signal to the speaker 170. The speaker 170 outputs speech to the environment (for example, to the user) based on the input speech signal. Note that in this specification, the term "speech" includes not only an uttered or synthesized speech but also a simpler sound.

The notification controller 118 is a controller that is connected to the LED 180 and controls a notification of a status by the speech control apparatus 100 via the LED 180. The LED (Light-Emitting Diode) 180 is an element that emits light, and represents the status of the speech control apparatus 100 by an emission color and a lighting pattern (for example, ON, flickering, or OFF). Under the control of the CPU 111, the notification controller 118 uses the LED 180 to notify the user of a status of the speech control apparatus 100, such as a standby, speech-inputting, and responding. Note that the speech control apparatus 100 may include a display that can display a letter, a figure, and an image instead of the LED 180 for the notification of the status.

(2) Speech Recognition Server

Figure 3:
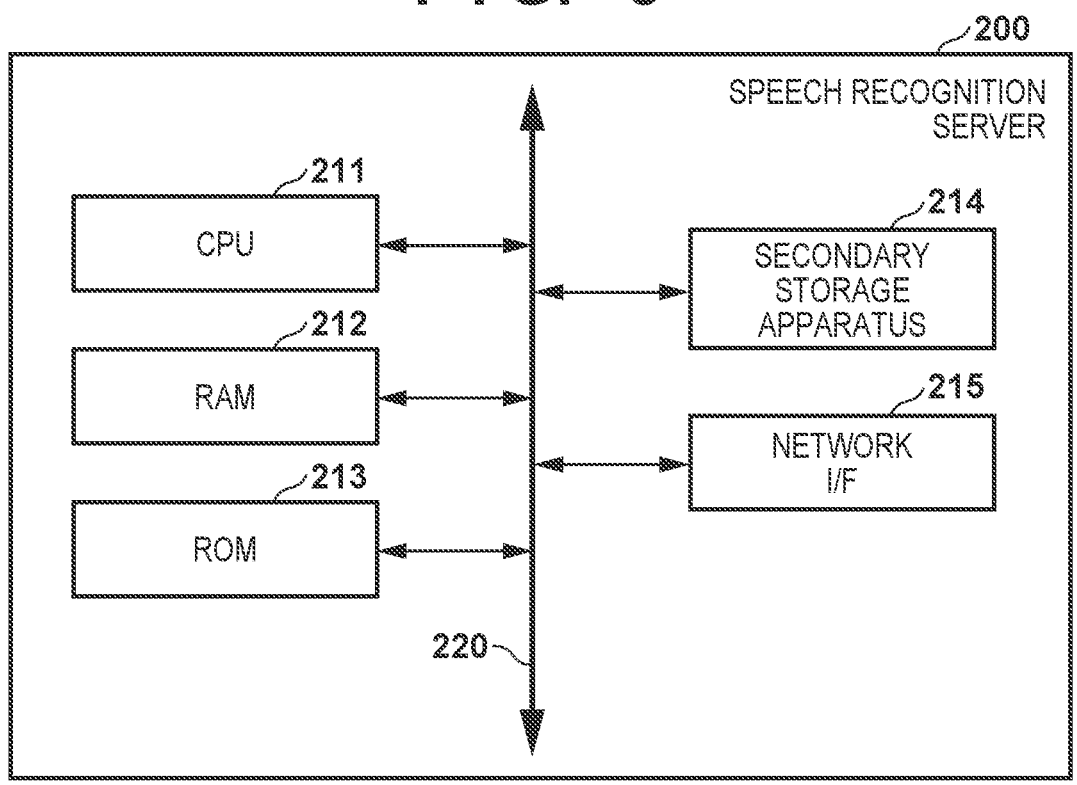
FIG. 3 is a block diagram showing an example of a physical arrangement of a speech recognition server according to an embodiment.

FIG. 3 is a block diagram showing an example of a physical arrangement of the speech recognition server 200 according to this embodiment. Referring to FIG. 3, the speech recognition server 200 includes a CPU 211, a RAM 212, a ROM 213, a secondary storage apparatus 214, and a network I/F 215. An internal bus 220 is a signal line that interconnects the CPU 211, the RAM 212, the ROM 213, the secondary storage apparatus 214, and the network I/F 215.

The CPU 211 is a processor that controls the overall operation of the speech recognition server 200. The control function of the CPU 211 can be implemented by, for example, executing a computer program stored in advance in the ROM 213 or the secondary storage apparatus 214 and loaded into the RAM 212. The computer program may be downloaded from the outside of the speech recognition server 200. The RAM 212 is a volatile memory, and provides a temporary work memory area to the CPU 211. The ROM 213 is a nonvolatile memory, and stores, for example, a boot program for activating the speech recognition server 200. The secondary storage apparatus 214 is an auxiliary storage device that provides a large memory area, as compared with the RAM 212 and the ROM 213. The secondary storage apparatus 214 may be, for example, an HDD (Hard Disk Drive) or an SSD (Solid State Drive). The network I/F 215 is a communication interface for communication with another apparatus by the speech recognition server 200. The network I/F 215 may transmit/receive data wirelessly or via a cable. For wireless communication, the network I/F 215 may include an antenna, an RF circuit, and a baseband circuit.

(3) Image Processing Apparatus

Figure 4:
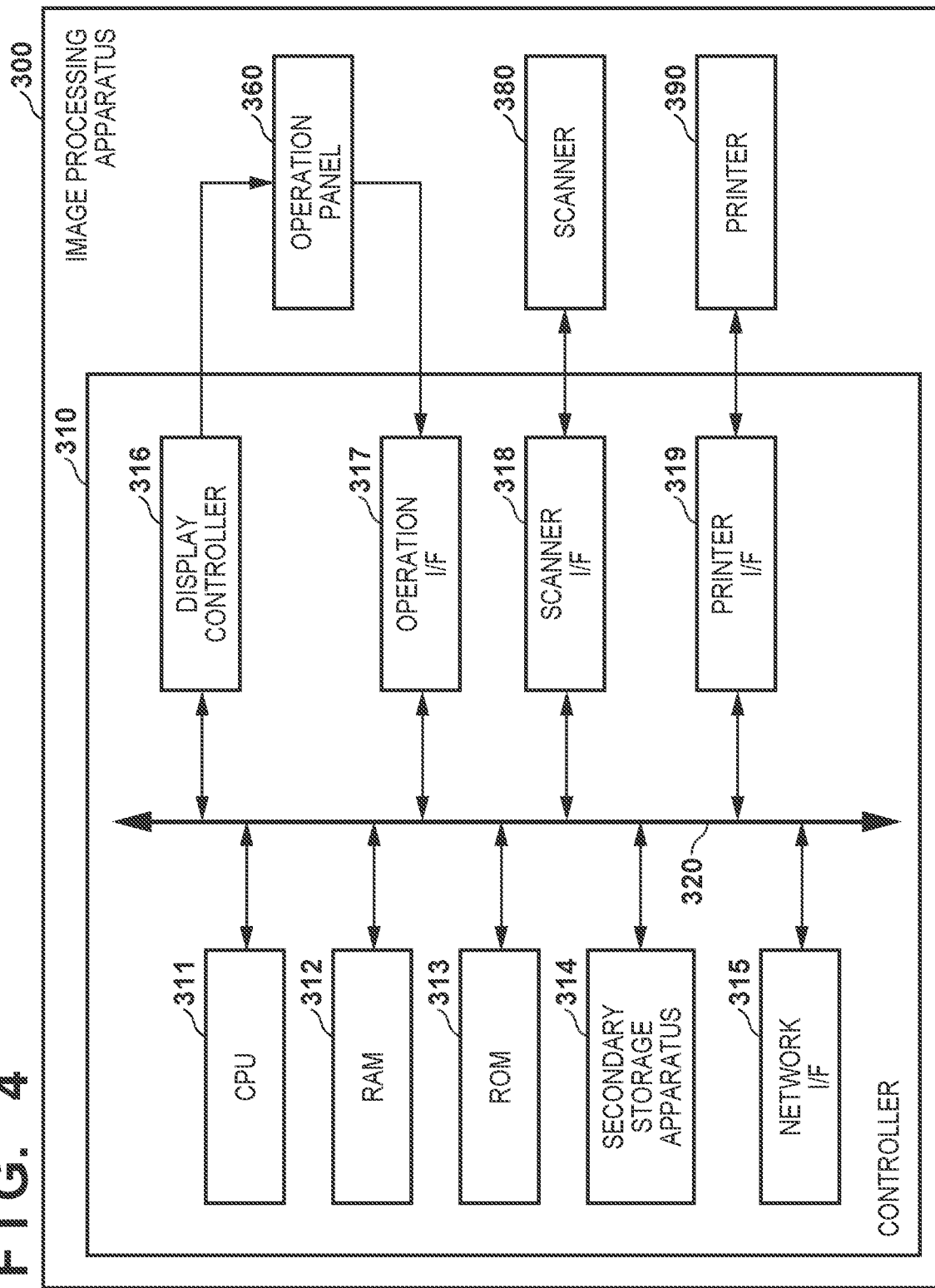
FIG. 4 is a block diagram showing an example of a physical arrangement of an image processing apparatus according to an embodiment.

FIG. 4 is a block diagram showing an example of a physical arrangement of the image processing apparatus 300 according to this embodiment. Referring to FIG. 4, the image processing apparatus 300 includes a controller 310, an operation panel 360, a scanner 380, and a printer 390. The controller 310 includes a CPU 311, a RAM 312, a ROM 313, a secondary storage apparatus 314, a network I/F 315, a display controller 316, an operation I/F 317, a scanner I/F 318, and a printer I/F 319. An internal bus 320 is a signal line that interconnects the CPU 311, the RAM 312, the ROM 313, the secondary storage apparatus 314, the network I/F 315, the display controller 316, the operation I/F 317, the scanner I/F 318, and the printer I/F 319.

The CPU 311 is a processor that controls the overall operation of the image processing apparatus 300. The control function of the CPU 311 can be implemented by, for example, executing a computer program stored in advance in the ROM 313 or the secondary storage apparatus 314 and loaded into the RAM 312. The computer program may be downloaded from the outside of the image processing apparatus 300. The RAM 312 is a volatile memory, and provides a temporary work memory area to the CPU 311. The ROM 313 is a nonvolatile memory, and stores, for example, a boot program for activating the image processing apparatus 300. The secondary storage apparatus 314 is an auxiliary storage device that provides a large memory area, as compared with the RAM 312 and the ROM 313. The secondary storage apparatus 314 may be, for example, an HDD or an SSD. In this embodiment, a history database 326 described later is implemented in the secondary storage apparatus 314. It should be noted that the history database 326 is not limited to such an example and may be implemented in an external apparatus that is accessible by the image processing apparatus 300 (for example, by the CPU 311). The network I/F 315 is a communication interface for communication with another apparatus by the image processing apparatus 300. The network I/F 315 may transmit/receive data wirelessly or via a cable. For wireless communication, the network I/F 315 may include an antenna, an RF circuit, and a baseband circuit.

The display controller 316 and the operation I/F 317 are connected to the operation panel 360. Under the control of the CPU 311, the display controller 316 displays a user interface (UI) image on the operation panel 360. The operation panel 360 is a display device that can display an image. The operation panel 360 may be, for example, a touch panel that accepts a touch input by the user. Instead, the operation panel 360 may be a display such as an LCD (Liquid Crystal Display) accompanied with, for example, an input device such as a keypad and buttons. The operation panel 360 outputs, to the controller 310 via the operation I/F 317, an operation signal indicating contents of the accepted user input. Under the control of the CPU 311, the operation I/F 317 writes the contents of the user input indicated by the operation signal in the RAM 312.

The scanner I/F 318 is a connection interface for connecting the controller 310 to the scanner 380. The scanner 380 is an image processing unit that reads an original to generate image data of a read image. That is, the scanner 380 provides the original reading function of the image processing apparatus 300. The scanner 380 may include one or both of an original platen on which an original is placed and an ADF for automatically conveying an original (neither of which is shown). Under the control of the CPU 311, the scanner I/F 318 transmits, to the scanner 380, a control command (also referred to as a job hereinafter) for instructing reading of an original, and writes image data received from the scanner 380 in the RAM 312.

The printer I/F 319 is a connection interface for connecting the controller 310 to the printer 390. The printer 390 is an image processing unit that forms an image on a sheet based on image data received from the controller 310. That is, the printer 390 provides the image forming function of the image processing apparatus 300. Under the control of the CPU 311, the printer I/F 319 transmits, to the printer 390, a control command for instructing formation of an image, and writes the result of an image forming operation received from the printer 390 in the RAM 312.

1-3. Functionality of Each Apparatus (1) Speech Control Apparatus

Figure 5:
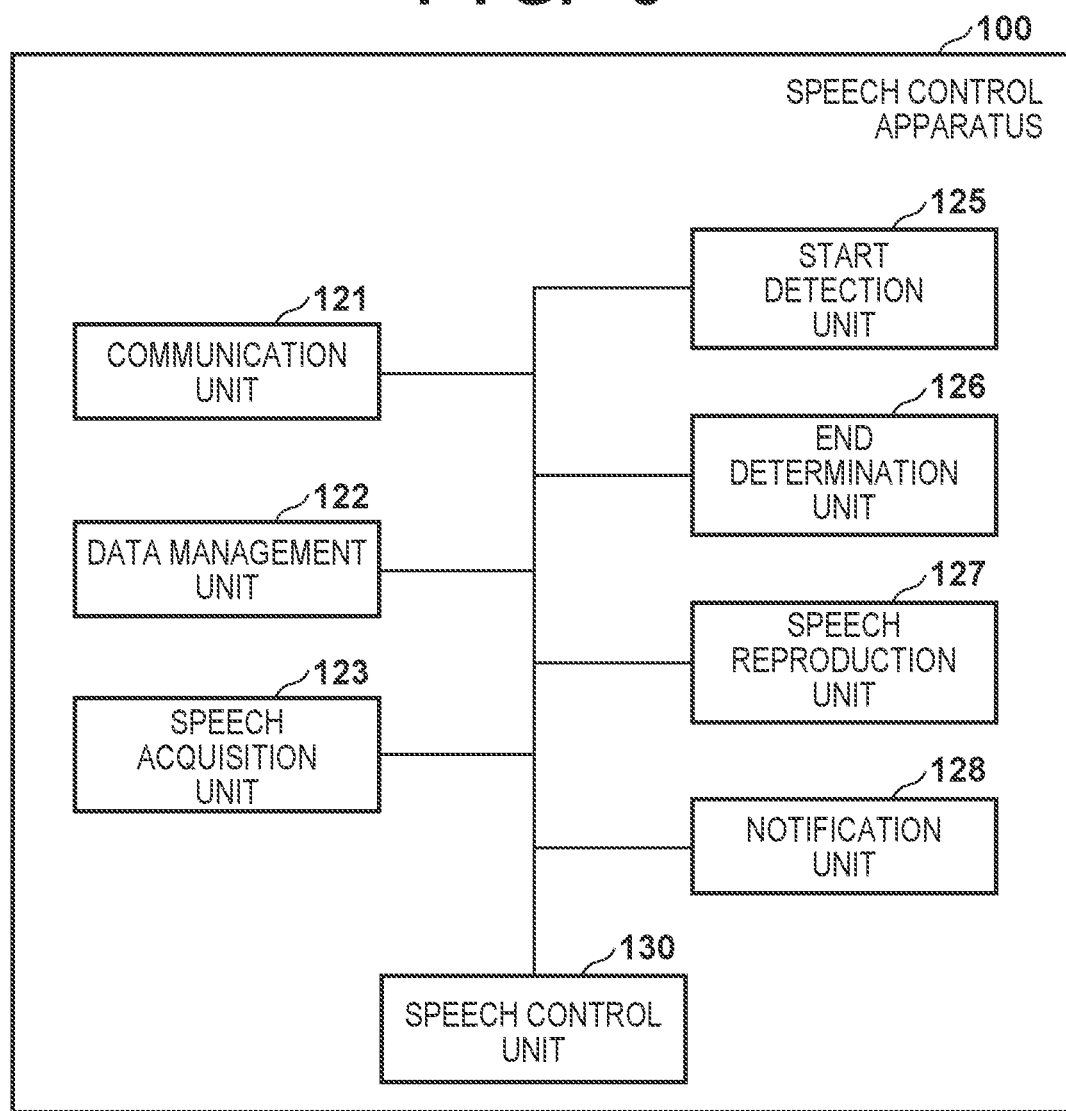
FIG. 5 is a block diagram showing an example of a functional arrangement of the speech control apparatus according to an embodiment.

FIG. 5 is a block diagram showing an example of a functional arrangement of the speech control apparatus 100 according to this embodiment. Referring to FIG. 5, the speech control apparatus 100 includes a communication unit 121, a data management unit 122, a speech acquisition unit 123, a start detection unit 125, an end determination unit 126, a speech reproduction unit 127, a notification unit 128, and a speech control unit 130. Each of these functional blocks can be realized by, for example, the CPU 111 of the speech control apparatus 100 executing a corresponding computer program in cooperation with other hardware.

The communication unit 121 transmits data to another apparatus connected to the network 20 and receives data from the other apparatus via the network I/F 115. For example, the communication unit 121 transmits input speech data (to be described later) to the speech recognition server 200. The communication unit 121 receives response speech data from the speech recognition server 200.

The data management unit 122 uses the secondary storage apparatus 114 to manage data necessary to control speech input/output by the speech control apparatus 100. In this specification, data management can include, for example, saving of data in a predetermined memory area, update of data, restriction on access to data, and reading of data. For example, the data management unit 122 manages, in a predetermined memory area of the secondary storage apparatus 114, authentication information necessary for communication with the speech recognition server 200.

The speech acquisition unit 123 converts an analog speech signal of speech acquired by the microphone 160 into speech data, and temporarily holds the speech data in the RAM 112. For example, the speech acquisition unit 123 may format the speech data in accordance with a speech file format (for example, an MP3 format) supported by both the speech control apparatus 100 and the speech recognition server 200.

The start detection unit 125 monitors a user input to the speech control apparatus 100, and determines, based on the detected user input, whether to start interaction with the user by the speech control apparatus 100 using the speech UI. For example, if, based on the speech data acquired by the speech acquisition unit 123, it is recognized that the user utters a wake word to start interaction, the start detection unit 125 may determine to start interaction with the user. If, for example, it is detected that the user performs a predetermined operation (for example, presses a button) on the input device (not shown) of the speech control apparatus 100, the start detection unit 125 may determine to start interaction with the user. If the start detection unit 125 determines to start interaction with the user, it outputs a control start signal to the speech control unit 130. The character string or speech waveform of the above-described wake word is decided in advance and registered in the speech control apparatus 100 (managed as data by the data management unit 122). The user can operate the image processing apparatus 300 as intended by himself/herself by uttering the wake word and then uttering an operation of the image processing apparatus 300 together with desired setting contents.

The end determination unit 126 determines an end timing of an individual speech input from the user based on the speech data acquired by the speech acquisition unit 123. As an example, if the end determination unit 126 compares the characteristic of an input speech signal with that of a known speech, and determines that the user or a person has not uttered for at least a given period, it can determine that an individual speech input has ended (an utterance has stopped). The characteristic of the known speech may be a user-specific characteristic registered in advance for each user who uses the speech control system 10 or the characteristic of speech of a standard person (that is, the characteristic of speech common to a plurality of users). As another example, if, based on the speech data acquired by the speech acquisition unit 123, the end determination unit 126 recognizes that the user has uttered a specific keyword, it may determine that an individual speech input has ended. As still another example, end determination may be performed by analyzing the meaning or context of the input speech of the user recognized based on the speech data. If the end determination unit 126 determines that an individual speech input has ended, it outputs an utterance end signal to the speech control unit 130. Note that such end determination may be performed by the speech recognition server 200 instead of the end determination unit 126. In the following description, a period during which speech acquired by the speech acquisition unit 123 includes no input speech of the user will be hereinafter referred to as a blank period.

Under the control of the speech control unit 130, the speech reproduction unit 127 uses the audio controller 117 and the speaker 170 to reproduce an output speech represented by speech synthesis data received by the communication unit 121.

Under the control of the speech control unit 130, the notification unit 128 makes various notifications to the user using the notification controller 118 and the LED 180. For example, the notification unit 128 may turn on, flicker, or turn off the LED 180 during a period in which a speech interaction session continues, a period in which an individual input speech is detected, or a period in which a response speech is output. Furthermore, the notification unit 128 may notify the user of the occurrence of an event such as the start or end of a speech interaction session using the LED 180. Note that a notification may also be made to the user by another method such as output of a sound effect or a vibration.

The speech control unit 130 controls acquisition of an input speech of the user and output of a response speech by the speech control apparatus 100 in cooperation with the speech recognition server 200. For example, the speech control unit 130 transmits, to the speech recognition server 200 via the communication unit 121, the speech data acquired by the speech acquisition unit 123, and requests that the speech recognition server 200 recognizes the input speech of the user. The speech control unit 130 receives response speech data as a response to the above request from the speech recognition server 200 via the communication unit 121, and causes the speech reproduction unit 127 to reproduce a response speech based on the received response speech data.

Herein, a progress of speech interaction between the user and the speech control apparatus 100 under the control of the speech control unit 130 will be described with some speech examples. The control by the speech control unit 130 starts in response to the input of the control start signal from the start detection unit 125. For example, the speech control unit 130 handles sequential speech data of speech acquired by the speech acquisition unit 123 until the utterance end signal is input from the end determination unit 126, as a series of input speech data. Assume, for example, that the user utters the wake word to the speech control apparatus 100, and then utters "Make two copies in full-color". The wake word is recognized by the start detection unit 125, and the start detection unit 125 outputs the control start signal to the speech control unit 130. In response to the input of the control start signal, the speech control unit 130 causes the speech acquisition unit 123 to start acquiring the input speech. The speech acquisition unit 123 acquires the input speech of "Make two copies in full-color" uttered following the wake word. The end determination unit 126 recognizes a blank period after "Make two copies in full-color", and outputs the utterance end signal to the speech control unit 130. In response to the input of the utterance end signal, the speech control unit 130 causes the speech acquisition unit 123 to end the acquisition of the input speech. During a period in which the speech acquisition unit 123 acquires the series of input speech data, the notification unit 128 notifies the user of the status of speech-inputting by, for example, turning on the LED 180.

Next, the speech control unit 130 transmits, to the speech recognition server 200 via the communication unit 121, the input speech data of "Make two copies in full-color" temporarily held in the RAM 112, and awaits a response from the speech recognition server 200. The response received from the speech recognition server 200 via the communication unit 121 can include response speech data generated by the speech recognition server 200 (to be described later). The response speech data is data representing a response speech of "Please set the original". The speech control unit 130 outputs the response speech data to the speech reproduction unit 127, and causes the speech reproduction unit 127 to reproduce a response speech. As a result, the speaker 170 outputs the response speech. During a period in which the speech reproduction unit 127 reproduces the response speech, the notification unit 128 notifies the user of the status of responding by, for example, flickering the LED 180.

The response from the speech recognition server 200 can include session control information indicating whether to continue or end the speech interaction session. If, for example, the session control information indicates to continue the speech interaction session, the speech control unit 130 causes the speech acquisition unit 123 to restart acquiring an input speech after the end of the reproduction of the response speech. In this case, the user can make a next speech input without uttering the wake word again. This facilitates natural speech interaction between the user and the speech control apparatus 100, and the user can give the system settings and an instruction for a desired operation of the image processing apparatus 300 via a sequence of interactions. If the session control information indicates to end the speech interaction session, for example, the speech control unit 130 causes the notification unit 128 to turn off the LED 180, thereby transitioning to the standby status. In this case, the user can restart the speech interaction by newly uttering the wake word (or by performing the predetermined operation on the speech control apparatus 100).

(2) Speech Recognition Server

Figure 6:
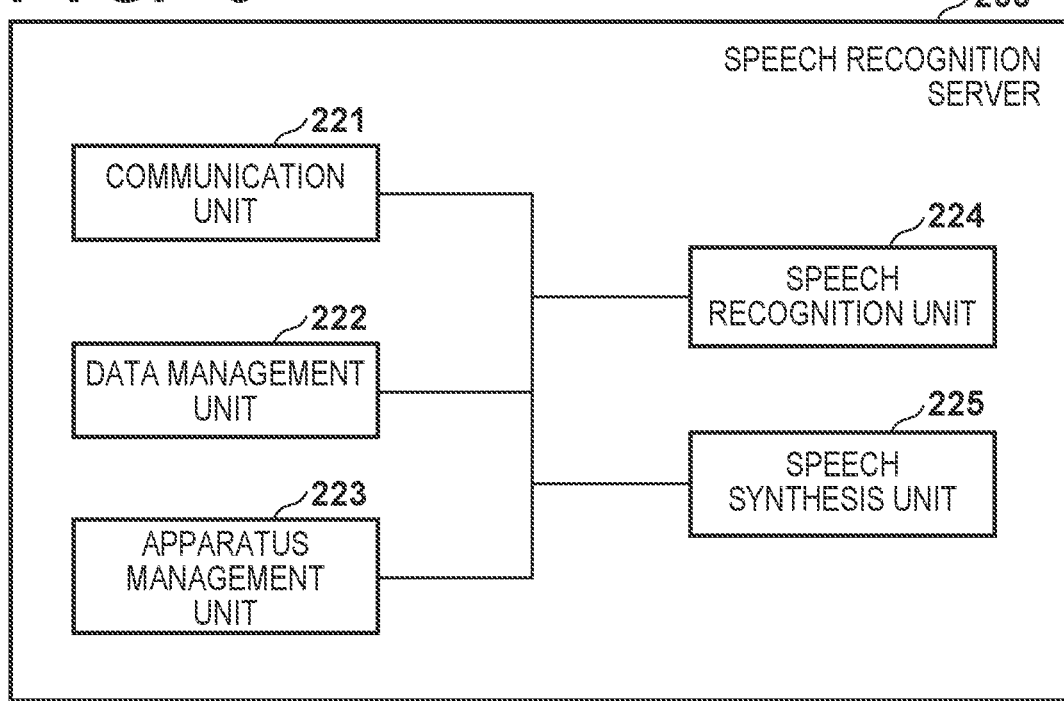
FIG. 6 is a block diagram showing an example of a functional arrangement of the speech recognition server according to an embodiment.

FIG. 6 is a block diagram showing an example of a functional arrangement of the speech recognition server 200 according to this embodiment. Referring to FIG. 6, the speech recognition server 200 includes a communication unit 221, a data management unit 222, an apparatus management unit 223, a speech recognition unit 224, and a speech synthesis unit 225. Each of these functional blocks can be realized by, for example, the CPU 211 of the speech recognition server 200 executing a corresponding computer program in cooperation with other hardware.

The communication unit 221 transmits data to another apparatus connected to the network 20 and receives data from another apparatus via the network I/F 215. For example, the communication unit 221 receives input speech data from the speech control apparatus 100. The communication unit 221 transmits intent data generated by the speech recognition unit 224 (to be described later) to the image processing apparatus 300. The communication unit 221 receives response text data from the image processing apparatus 300. Furthermore, the communication unit 221 transmits, to the speech control apparatus 100, response speech data that can include the above-described session control information.

The data management unit 222 uses the secondary storage apparatus 214 to manage data necessary to recognize and synthesize speech by the speech recognition server 200. For example, the data management unit 222 manages, in a predetermined memory area of the secondary storage apparatus 214, authentication information necessary for communication with the speech recognition server 200. Furthermore, the data management unit 222 manages, for example, an acoustic model, a language model, and word dictionary data for converting an input speech represented by the input speech data into text data as a speech recognition result. In this embodiment, the data management unit 222 manages an intent interpretation data set (to be described later with reference to FIGS. 8 to 13D) used to generate intent data representing the user's intent from the text data derived as the speech recognition result. Furthermore, the data management unit 222 manages speech synthesis dictionary data for generating response speech data from response text data.

The apparatus management unit 223 manages interconnection among the apparatuses included in the speech control system 10. For example, the apparatus management unit 223 manages identification information, address information, and authentication information of each of the client terminal 50, the speech control apparatus 100, and the image processing apparatus 300. Furthermore, the apparatus management unit 223 manages correspondence (for example, a one-to-many relationship) between the speech control apparatus 100 and the image processing apparatus 300 by holding information for mapping the pieces of identification information. In addition, the apparatus management unit 223 may manage information about users who are allowed to use the speech control system 10 or each apparatus (for example, identification information, group information and authentication information).

The speech recognition unit 224 converts the input speech data received from the speech control apparatus 100 into input text data as a speech recognition result using a known speech recognition technique. For example, the speech recognition unit 224 correlates the waveform and other feature amounts of an input speech represented by the input speech data with the acoustic model, thereby extracting a series of phonemes. Furthermore, the speech recognition unit 224 recognizes text represented by the series of phonemes through morphological analysis, syntactic analysis, semantic analysis, and context analysis using the word dictionary data. The input text data derived as a speech recognition result represents text recognizable in this way. Furthermore, the speech recognition unit 224 recognizes the user's intent represented by the input speech using the intent interpretation data set (to be described in detail later). Then, the speech recognition unit 224 generates intent data indicating the recognition result of the user's intent, and transmits the generated intent data to the image processing apparatus 300 via the communication unit 221.

The speech synthesis unit 225 synthesizes a response speech based on response text data received from the image processing apparatus 300. The response text data is data representing, in the text format, contents of speech to be read by the speech control apparatus 100. More specifically, the speech synthesis unit 225 converts, using the speech synthesis dictionary data managed by the data management unit 222, the response text data into speech data reproducible by the speech control apparatus 100, thereby generating response speech data. The speech synthesis unit 225 may format the generated response speech data in accordance with a speech file format such as an MP3 format.

Recognition of the user's intent based on the input text data by the speech recognition unit 224 is performed using an intent list and an entity list included in the intent interpretation data set. The intent list is a list of text data to be correlated with the input text data to classify contents of the input speech of the user into one of some intent types with respect to operations executable by the image processing apparatus 300. In the following description, each of user's intent types will be hereinafter referred to as an intent.

FIGS. 8 and 9 show an example of the intent list. The intent list includes two data items of "Intent ID" and "Utterance". The intent ID indicates an identifier for identifying each intent. The utterance indicates a sample of text to be correlated with the input text data for classification. As will be understood from FIGS. 8 and 9, in the intent list, contents of a plurality of utterances can be defined for one intent ID. This can classify the user's intent into a correct type in a situation where the same intent is represented by different expressions. The contents of each utterance can include the entity ID enclosed in curly brackets. The entity ID plays a role of a place holder, and one of words associated with an entity ID in the entity list is substituted into the place holder.

FIGS. 10 to 12 show an example of the entity list. The entity list includes four data items of "Entity ID", "Value ID", "Value", and "Synonyms". The entity ID is an identifier for identifying each entity. The value ID is an identifier for identifying a word associated with each entity. The value is a character string representing the word identified by the value ID. Each synonym is a character string representing rephrasing of the same word. In this way, by making it possible to define one or more different synonyms of a representation indicating the same meaning, it is possible to appropriately interpret instruction contents intended by the user in a situation where the same operation or setting is represented by different expressions.

More specifically, the speech recognition unit 224 calculates the degree of similarity between input text data and a text sample obtained by substituting a value or synonym of each entity included in the entity list into each intent included in the intent list. Then, the speech recognition unit 224 classifies an input speech into an intent corresponding to the text sample with which a degree of similarity exceeding a preset threshold is indicated. At the same time, the speech recognition unit 224 acquires the entity ID and value ID of the entity included in the text sample. If the degrees of similarity of a plurality of text samples exceed the threshold, one text sample having the highest degree of similarity may be selected or several text samples may be selected as candidates of a recognition result in descending order of degree of similarity. In this way, the speech recognition unit 224 acquires the knowledge representation of the user's intent represented by the input speech. Assume, for example, that an input speech of "Make two copies in full-color" is obtained. The speech recognition unit 224 correlates input text data of "Make two copies in full-color" with the intent list and the entity list. This input text data matches the utterance of "Make {NUMBER} {CopyOperation} in {ColorMode}" identified by an intent ID "Copy_with_2_settings". Corresponding entities are {NUMBER}=2, {ColorMode}=cm_00005 (full-color), {CopyOperation}=copy_00000 (copies). Therefore, the user's intent is recognized as a combination of an intent "Copy_with_2_settings", the first entity "2", the second entity "cm_00005", and the third entity "copy_00000". The speech recognition unit 224 generates intent data in which such recognition result is described. Note that "copies" and "replications" are associated with the entity ID "copy_00000" in the entity list, and thus even if an input speech is "Make two replications in full-color", the same recognition result can be acquired.

FIGS. 13A to 13D show some examples of the intent data that can be generated by the speech recognition unit 224. The intent data is data including a plurality of structured data fields. The first data filed of the intent data represents an intent into which the input speech is classified, and describes a filed name "Intent ID" and a separator ":", followed by the intent ID. The second data field of the intent data represents zero or one or more entities, and describes a field name "Entities" and a separator ":", followed by a list of pair(s) of entity ID and value ID. Intent data 231 in FIG. 13A includes an intent "Copy_with_noc" and two entities {NUMBER}=3 and {CopyOperation}=copy_00000. This represents the user's intent to instruct the image processing apparatus 300 to make three copies of an original. Intent data 232 in FIG. 13B includes an intent "Send_history1" and two entities {Timing}=timing_00001 and {SendOperation}=send_00000. Intent data 233 in FIG. 13C includes an intent "Copy_history2" and two entities {Frequency}=freq_00001 and {CopyOperation}=copy_00000. Intent data 234 in FIG. 13D includes an intent "Recommend_setting" and two entities {NUMBER}=4 and {PrintOperation}=print_00000. How the user's intents are interpreted in connection with the intent data 232 to 234 are described later in detail. Note that the structure of the intent data is not limited to the illustrated examples. For example, the speech recognition unit 224 may include a plurality of candidates of a recognition result in the intent data. The speech recognition unit 224 may additionally include, in the intent data, the degree of similarity between a sample and an input calculated with respect to each intent or each entity.

(3) Image Processing Apparatus

Figure 7:
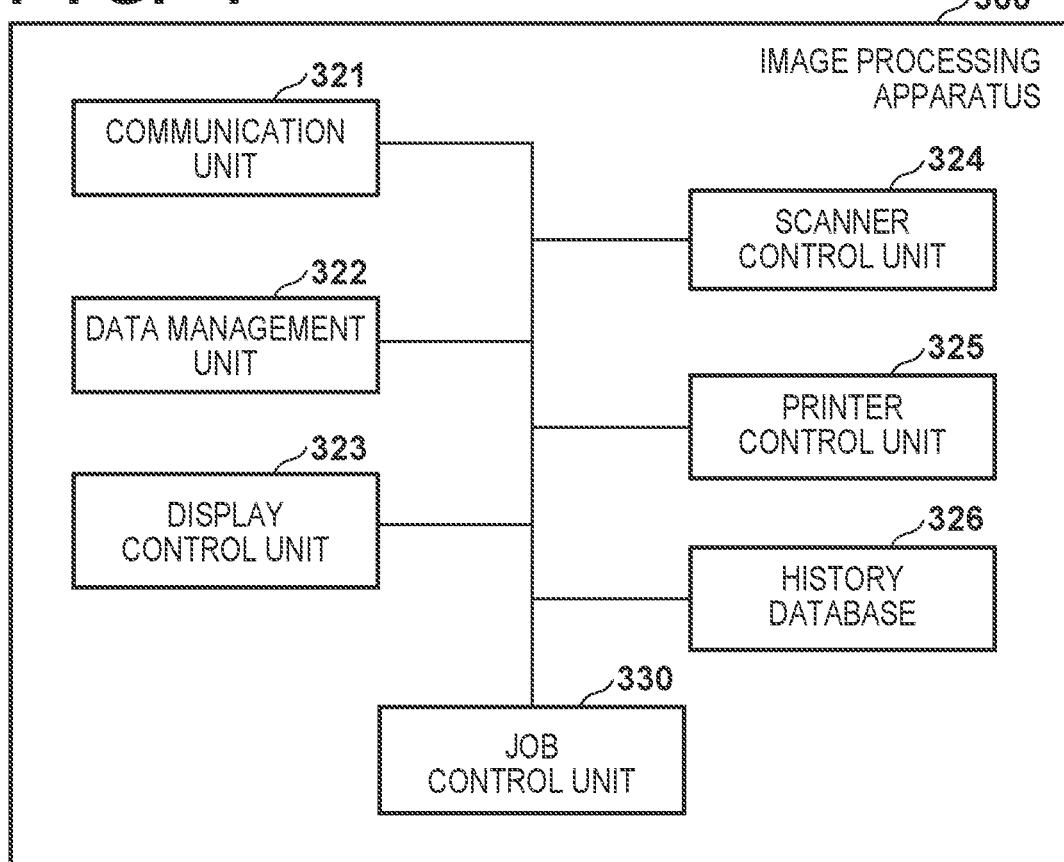
FIG. 7 is a block diagram showing an example of a functional arrangement of the image processing apparatus according to an embodiment.

FIG. 7 is a block diagram showing an example of a functional arrangement of the image processing apparatus 300 according to this embodiment. Referring to FIG. 7, the image processing apparatus 300 includes a communication unit 321, a data management unit 322, a display control unit 323, a scanner control unit 324, a printer control unit 325, a history database 326, and a job control unit 330. Each of these functional blocks can be realized by, for example, the CPU 311 of the image processing apparatus 300 executing a corresponding computer program in cooperation with other hardware.

The communication unit 321 transmits data to another apparatus connected to the network 20 and receives data from another apparatus via the network I/F 315. For example, the communication unit 321 receives the above-described intent data from the speech recognition server 200. The communication unit 321 transmits response text data to the speech recognition server 200. The communication unit 321 receives, from the client terminal 50, an instruction signal to instruct execution of a job. The communication unit 321 transmits read image data to the client terminal 50.

The data management unit 322 uses the secondary storage apparatus 314 to manage data necessary for image formation and reading of an original by the image processing apparatus 300. For example, the data management unit 322 manages setting data for settings of the image processing function of the image processing apparatus 300, job data for a job to be executed, and authentication information necessary for communication with the speech recognition server 200.

The display control unit 323 controls display of an image (for example, a UI image) by the operation panel 360 via the display controller 316. The display control unit 323 interprets contents of a user input indicated by an operation signal accepted from the operation panel 360 via the operation I/F 317, and assigns the user input to an appropriate functional block of the image processing apparatus 300. In response to a request from the job control unit 330, the display control unit 323 updates display contents of the operation panel 360.

Under the control of the job control unit 330, the scanner control unit 324 causes the scanner 380 to read an original via the scanner I/F 318, and outputs image data of the generated read image to the data management unit 322. Furthermore, the scanner control unit 324 acquires the operation status of the scanner 380 via the scanner I/F 318.

Under the control of the job control unit 330, the printer control unit 325 causes the printer 390 to form an image via the printer I/F 319. The printer control unit 325 acquires the operation status of the printer 390 via the printer I/F 319.

The history database 326 is a database that retains history data of one or more jobs executed in the past by the image processing units of the image processing apparatus 300, that is, the scanner 380 and the printer 390. The history data typically includes respective entries of the jobs that were executed in the past. Each entry indicates timing information indicative of when the corresponding job was executed (for example, date and time), and at least one setting value set in that job.

FIG. 14 is an explanatory view showing an example of a configuration of history data 1400 according to an embodiment. With reference to FIG. 14, the history data 1400 includes Owner 1401, Group 1402, date_time 1403, type 1404 and Job ID 1405, as well as scan job parameters 1410 and print job parameters 1420. The Owner 1401 is identification information for identifying a user who issued the job (for example, a name or a user ID). The Group 1402 is identification information for identifying a group to which the user who issued the job belongs (for example, a group ID). The date_time 1403 indicates the date and time when the job was created. That is, the date_time 1403 is timing information indicative of a timing of job execution. The type 1404 indicates a type of the job (for example, "Print", "Scan", "Copy" or "Send"). The Job ID 1405 is an identifier for uniquely identifying each job. The scan job parameters 1410 is a group of setting items that may be set for a scan job. The print job parameters 1420 is a group of setting items that may be set for a print job. Both of the scan job parameters 1410 and the print job parameters 1420 may be set for a copy job. A send job may be a job for sending read image data to a designated transmission destination, and the scan job parameters 1410 may be set for a send job. The central column of FIG. 14 gives a description about each setting item. The right column indicates a data sample for a case of a copy job. Note that the configuration of the history data 1400 shown in FIG. 14 is a mere example. The history data may include another item, and may be configured without some of the illustrated items. Setting items which are not reused for a job in the future may be omitted from the configuration of the history data, or may be left blank.

The job control unit 330 controls setting and execution of a job by the scanner 380 and the printer 390 while interacting with the user using the UI provided to the user by the speech control system 10. The UI provided to the user by the speech control system 10 can include a speech UI provided via the speech control apparatus 100 and a GUI provided via the operation panel 360 of the image processing apparatus 300. If, for example, execution of a job is instructed from the user via the speech UI or the GUI, the job control unit 330 causes one or both of the scanner control unit 324 and the printer control unit 325 to start an operation corresponding to the instructed job. The job control unit 330 collects operation statuses of the scanner 380 and the printer 390 from the scanner control unit 324 and the printer control unit 325, and causes the collected operation status information to be output with speech or to be displayed on the operation panel 360. Furthermore, the job control unit 330 adds, to the history database 326, entries indicating setting values that were set in jobs executed by the scanner control unit 324 and the printer control unit 325 (for example, records as in the above-described history data 1400). That is, the job control unit 330 retains, in the history database 326, setting values for image processing utilized in the past.

In this embodiment, an instruction from a user via the speech UI is received from the speech recognition server 200 in the form of the above-described intent data. For example, intent data which describes an intent including the entity {CopyOperation} indicates that a copy job should be executed. Intent data which describes an intent including both of {ScanOperation} and {PrintOperation} indicates that a copy job should be executed, too. Intent data which describes an intent including the entity {PrintOperation} indicates that a print job should be executed. Intent data which describes an intent including the entity {ScanOperation} indicates that a scan job should be executed. Intent data which describes an intent including the entity {SendOperation} indicates that a send job should be executed.

The job control unit 330 specifies setting values to be set for a job based on Entity IDs and Value IDs described in the intent data. For example, when the intent data 231 shown in FIG. 13A is received, the job control unit 330 sets the number of prints "3" for a copy job as a setting value. After finishing the job execution, the job control unit 330 adds a records to the history data 1400 indicating that the number of prints (NomOfPrint) was three (along with some other attributes). The job control unit 330 may use default values as setting values for setting items that were not indicated by the intent data (that is, not explicitly designated by the user with the input speech). Alternatively, the job control unit 330 may request the user with a response speech to designate setting values for setting items that have not been designated. Note that, depending on the operation status of the scanner 380 or the printer 390, the job control unit 330 may suspend or reject the instructed execution of the job instead of initiating the execution. The job control unit 330 generates response text data representing a content of a response speech to be read by the speech control apparatus 100 as a response to the reception of the intent data, and send the generated response text data back to the speech recognition server 200. The response speech is synthesized by the speech recognition server 200 based on this response text data, and the response speech is output from the speaker 170 of the speech control apparatus 100.

The job control unit 330 may transmit, to the speech recognition server 200 via the communication unit 321, session control information indicating whether to continue the speech interaction session together with the response text data. The job control unit 330 maintains, throughout one session, a control state (for example, a job status such as waiting for confirmation of setting items, and job parameters such as the intent ID, entity ID(s), and value ID(s)) of the corresponding job on the memory. The session can end at the end of execution of the job or at cancellation of the job.

In the case of controlling settings of the image processing unit using the above described speech UI, the user is required to iteratively utter a setting value for each desired setting value except for the case where the default values can be used as they are. According to the technique of Japanese Patent Laid-Open No. 2007-114297, the user can assign a soft key having a registered auditory name to a set of setting values in advance so that the user can invoke the same set of setting items only by uttering the auditory name. However, the operation for assigning, in advance, a specific key to a set of setting values to be used in the future is itself a burden on the user. In addition, settings of a machine that are convenient to a user are not necessarily fixed and might not be predictable in advance.

To cope with this, the speech control system 10 according to this embodiment acquires setting values from history data of jobs in the past retained by the history database 326 and reuses them to thereby mitigate the burden of the iterative utterance of setting values by the user. Specifically, the job control unit 330 acquires a setting value for a new job to be executed by referring to at least one entry in the history data based on a result of speech recognition on an input speech of the user. The result of speech recognition herein may be the result indicated by the above-described intent data. Then, the job control unit 330 sets the acquired setting value for the new job and instructs the corresponding image processing unit to execute the job. In some examples, the job control unit 330 acquires, based at least on that a specific word has been recognized in a result of speech recognition on speech acquired by the microphone 160, one or more setting values from the history database 326 using an extraction condition corresponding to the specific word. The job control unit 330 then sets up a new job to be executed by the image processing unit based on those one or more setting values.

As described using FIG. 14, the history data 1400 in the history database 326 includes one entry per job identified by the Job ID 1405. In this embodiment, one or more entries that match a condition based on the result of speech recognition out of the plurality of entries included in the history data 1400 may be referred to for the reuse of setting values.

As an example, the job control unit 330 may specify an entry to be referred to in the history data 1400 based on a keyword that has been indicated by the result of speech recognition and represents an execution timing of a job to be referred to. For example, the intent data 232 in FIG. 13B includes the intent "Send_history1" and the entity {Timing}=timing_00001. The intent "Send_history1" represents the user's intention to execute a send job based on the history data, and the entity {Timing}=timing_00001 represents the job execution timing of one day ago of jobs to be referred to. The entity {Timing}=timing_00001 corresponds to the keyword "Yesterday", for example, uttered by the user. In this case, the job control unit 330 refers to an entry out of entries in the history data 1400 of a job that was issued by the same user one day ago and has the job type "Send", and may set the setting values indicated by the entry for a new send job.

As another example, the job control unit 330 may acquire a most frequently utilized setting value from one or more entries in the history data 1400 based on a keyword that has been indicated by the result of speech recognition and that is for acquiring a most frequently utilized setting value. For example, the intent data 233 in FIG. 13C includes the intent "Copy_history2" and the entity {Frequency}=freq_00001.

The intent "Copy_history2" represents the user's intention to execute a print job based on the history data. The entity {Frequency}=freq_00001 indicates that a most frequently utilized setting value should be acquired and reused by calculating frequencies from one or more entries. The entity {Frequency}=freq_00001 corresponds to the keyword "Usual", for example, uttered by the user. In this case, the job control unit 330 refers to one or more entries out of entries in the history data 1400 of jobs that were issued by the same user and has the job type "Copy" to calculate frequencies (for example, numbers of occurrences) of setting values indicated by those entries. The job control unit 330 may then determine a setting value with the highest indicated frequency for each setting item and set the determined setting value for a new print job.

As a further example, the job control unit 330 may determine, based on the result of speech recognition, whether to refer only to an entry associated with the same user in the history data 1400, or to refer also to an entry associated with another user. For example, the intent data 234 in FIG. 13D includes the intent "Recommend_setting", the entity {Number}=4, and the entity {PrintOperation}=print_00000. The intent "Recommend_setting" represents the user's thought to execute a job with setting values recommended based on the history data. In this case, the job control unit 330 acquires a setting value recommended for the new job by referring not only to an entry in the history data 1400 associated with the same user as the issuer user of the new job but also to entries associated with other users. The entries referred to herein may be entries associated with the same group as the group to which the issuer user of the new job belongs, for example. The entity {PrintOperation}=print_00000 indicates that a print job should be executed. In this case, the job control unit 330 refers to one or more entries out of entries in the history data 1400 of jobs that are associated with the same group as the group to which the issuer of the job belongs and have the job type "Print" to calculate frequencies of setting values indicated by those entries. The job control unit 330 may then determine a setting value with the highest indicated frequency for each setting item and set the determined setting value for a new print job.

The job control unit 330 may determine, based on the result of speech recognition, whether to request the user to confirm contents of settings before causing the image processing unit to execute the new job with the setting value acquired by referring to at least one entry in the history data 1400. For example, it may be assumed that the job control unit 330 requests a user to confirm contents of settings before job execution in the usual case, and the job control unit 330 may omit confirmation by the user in a case where an input speech includes a specific keyword (for example, "as soon as possible"). This can suppress redundancy of speech interaction depending on a user's intention and enhance user-friendliness of the speech UI. The specific keyword herein may be defined as an entity in the entity list.

Setting items that are allowed to be set from the history data 1400 (that is, setting items of which setting values are allowed to be reused from a job in the past) may be predefined for jobs that are executable by the image processing unit or the image processing apparatus 300. In this case, the job control unit 330 may acquire, by referring to an entry in the history data 1400, setting values of setting items that are allowed to be set from the history data 1400, and utilize values explicitly designated by an input speech or default values for the other setting items. The job control unit 330 may overwrite setting values acquired from the history data 1400 with values explicitly designated by an input speech from the user.

FIGS. 15A and 15B are explanatory views for describing an example of definition of setting items that are allowed to be set from the history data 1400. In FIG. 15A, for each setting item from scan job parameters 1410 and print job parameters 1420 of the history data 1400 described using FIG. 14, "YES" is assigned if setting from the history data is allowed, and "NO" is assigned if not allowed. For example, "name" and "mail_address" of "destination" in the scan job parameters 1410 are not allowed to be set from the history data. "preview" (indicating whether preview is required or not) and "scan_density_level" are allowed to be set from the history data. "subject" and "body" of "mail_contents" are not allowed to be set from the history data. "image_file_format", "scan_sides" (one side/both sides), "scan_size" and "ColorMode" are allowed to be set from the history data. "NomOfPrint" (the number of printed copies), "PaperSize", and "Paper_sides" (one side/both sides) in the print job parameters 1420 are allowed to be set from the history data. "document_format" is automatically determined from document data for printing. "ColorMode" is allowed to be set from the history data. In the example of FIG. 15A, destination of a send job is not allowed to be set from the history data so that a risk of information leakage due to wrong transmission of data is reduced. As shown in FIG. 15B, whether setting from the history data is allowed or not may be defined per job type basis. In the example in FIG. 15B, whether a setting value of each item is allowed to be reused from the history data or not is defined separately for print jobs, send jobs, scan jobs and copy jobs. It should be noted that the definitions shown in FIGS. 15A and 15B are mere examples, and any other definition may be used.

In a case where a setting value of a setting item that is not allowed to be set from the history data cannot be acquired from the result of speech recognition, the job control unit 330 may cause the speaker 170 of the speech control apparatus 100 to output a response speech for requesting an input of the setting value. For example, when the intent data 232 is received, the job control unit 330 can acquire, for example, setting values of the need of preview, scan density level, image file format, scan sides, scan size and color mode from entries of send jobs one day ago. However, destination and mail contents are not designated in the intent data 232. Hence, the job control unit 330 may generate response text data for a response speech requesting inputs of destination and mail contents, and send the generated response text data to the speech recognition server 200. It should be noted that an input for these setting items by the user may be made by a further input speech via the speech UI or made on the GUI.

FIG. 16 is an explanatory view for describing an example of search keys when referring to entries in the history data. The data items of the history data 1400 described using FIG. 14 are shown again in FIG. 16, and setting items that can be search keys when referring to the history data 1400 are labeled with the symbol "K" or "(K)" for each target job type. For example, Owner 1401, Group 1402 and date_time 1403, in addition to type 1404 can be search keys for any job type. In practice, a search key will be Owner 1401 when referring to the history data per a user basis, or Group 1402 when referring to the history data per a group basis, and date_time 1403 will also be a search key in a case where timing information is designated. For a print job, document_format may also be treated as a search key. For example, in a case where a format of a document to be printed is "pdf", history data of print jobs that printed PDF documents in the past may be preferentially referred to. For a send job, mail_address of destination may also be treated as a search key. That is, in a case where a specific address is a destination of a new send job, history data of send jobs addressed to the same destination in the past may be preferentially referred to.

Note that which user is involved in the speech interaction (that is, who is the speaker) may be identified from an input speech using a publicly known speaker recognition technique, or may be explicitly uttered by the user. The speech recognition server 200 may perform the speaker recognition and include a user ID of the recognized speaker in the intent data. Alternatively, the user may operate an input interface arranged at the speech control apparatus 100 or the image processing apparatus 300, for example, to thereby explicitly designate which user is speaking.

Process flows in the above-described embodiments will further be described in the next section along some typical scenarios.

2. Process Flow

2-1. Overall Flow

Figure 17:
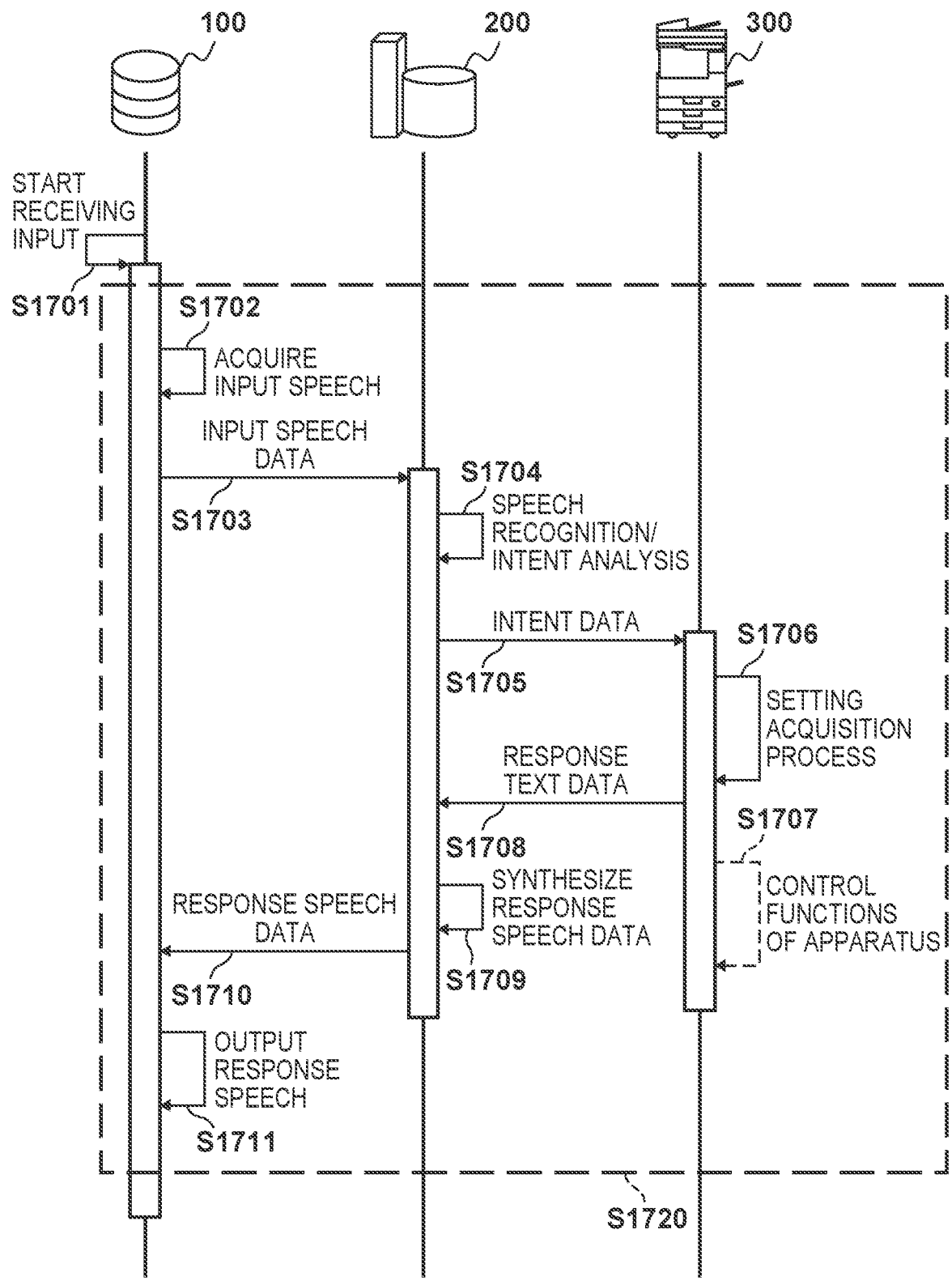
FIG. 17 is a sequence diagram showing an example of an overall flow of a speech control process according to an embodiment.

FIG. 17 is a sequence diagram showing an example of an overall flow of a speech control process that may be performed in the speech control system 10 according to the embodiment. The speech control process is executed by the speech control apparatus 100, the speech recognition server 200, and the image processing apparatus 300. Note that in the following description, a process step is abbreviated to S (step).

In S1701, the speech control apparatus 100 starts receiving a speech input from a user. For example, in response to recognition of an utterance of the wake word by a user, the start detection unit 125 of the speech control apparatus 100 may output the control start signal to the speech control unit 130, thereby starting a speech interaction session.

In S1702, the microphone 160 of the speech control apparatus 100 acquires an input speech of the user. Herein, it is assumed that the user utters speech for instructing the image processing apparatus 300 to execute a new job. The speech acquisition unit 123 generates input speech data of the acquired input speech. Generation of the input speech data can be continued until the end determination unit 126 detects the end of the speech input.

In S1703, the speech control unit 130 transmits the input speech data generated in S1702 to the speech recognition server 200. Note that the speech control unit 130 may transmit a series of input speech data at one time after the end determination unit 126 detects the end of the speech input. Instead, the speech control unit 130 may sequentially transmit fragments of input speech data to the speech recognition server 200 without waiting for the end timing of the speech input. The speech recognition unit 224 of the speech recognition server 200 receives the input speech data via the communication unit 221.

In S1704, the speech recognition unit 224 executes speech recognition on the input speech data to convert the input speech data into input text data, and generates intent data based on the input text data.

In S1705, the speech recognition unit 224 transmits the intent data to the image processing apparatus 300 via the communication unit 221. The job control unit 330 of the image processing apparatus 300 receives the intent data via the communication unit 321.

In S1706, the job control unit 330 executes a setting acquisition process for acquiring setting values to be set for a new job based on the received intent data. Some detailed examples of the setting acquisition process executed here will further be described later. In the setting acquisition process, the job control unit 330 generates response text data representing contents of speech to be output as a response to the user. In S1707, the job control unit 330 controls one or both of the image forming function and the original reading function of the image processing apparatus 300 in accordance with the user's intent indicated by the intent data. Note that, as indicated by dotted lines in the figure, S1707 is optional. That is, the control of the image processing unit of the image processing apparatus 300 does not necessarily be performed every time intent data is received, and may be performed once at the end of the speech interaction session, for example.

In S1708, the job control unit 330 transmits the response text data to the speech recognition server 200 via the communication unit 321. The speech synthesis unit 225 of the speech recognition server 200 receives the response text data via the communication unit 221. Note that in S1708, the job control unit 330 may transmit the session control information to the speech recognition server 200 together with the response text data, as described above.

In S1709, the speech synthesis unit 225 synthesizes a response speech that reads the received response text data, and generates response speech data representing the synthesized response speech.

In S1710, the speech synthesis unit 225 transmits the generated response speech data to the speech control apparatus 100 via the communication unit 221. The speech control unit 130 of the speech control apparatus 100 receives the response speech data (together with the session control information) via the communication unit 121.

Next, in S1711, the speech control unit 130 causes the speech reproduction unit 127 to reproduce the response speech based on the received response speech data, thereby outputting the response speech from the speaker 170.

The interaction for one round trip indicated by S1720 in FIG. 17 can be repeatedly performed as long as the session control information indicates to continue the speech interaction session except that the user cancels interaction. If the session control information indicates that the speech interaction session is to be ended, the speech control unit 130 can end the speech interaction session to transition to the standby state. If the start detection unit 125 newly detects a wake word, a speech interaction session will start again.

2-2. Setting Acquisition Process

Figure 18:
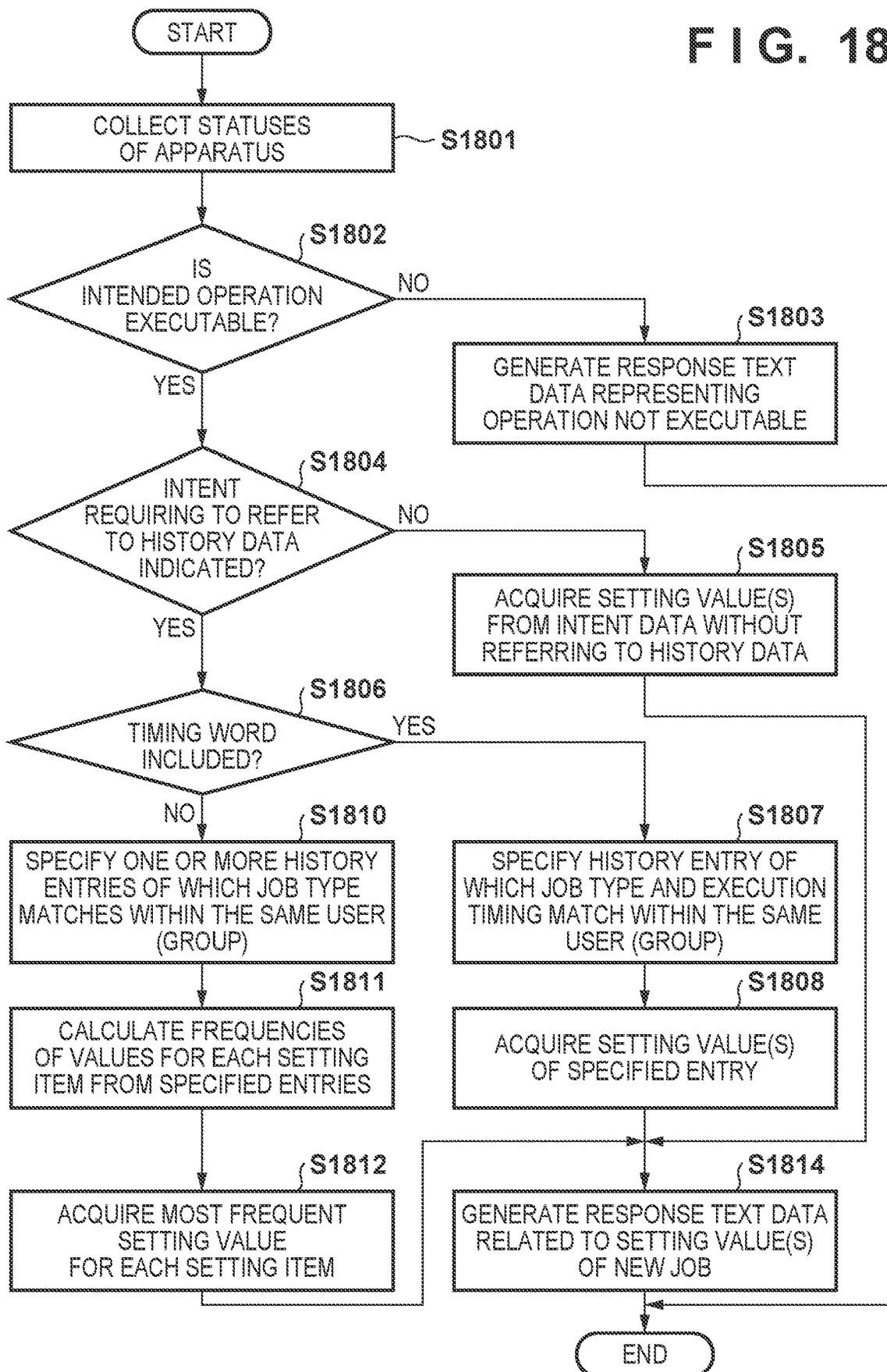
FIG. 18 is a flow chart showing an example of a detailed flow of a setting acquisition process according to an embodiment.

FIG. 18 is a flow chart showing an example of a detailed flow of a setting acquisition process that may be performed in S1706 of FIG. 17 according to this embodiment. The setting acquisition process can be realized as a process of the job control unit 330 by, for example, the CPU 311 of the image processing apparatus 300 executing a computer program loaded into the RAM 312.

The job control unit 330 collects, in S1801, various statuses of the image processing apparatus 300 upon reception of the intent data from the speech recognition server 200 as a trigger in S1705 of FIG. 17. For example, the job control unit 330 can acquire the operation status of the scanner 380 from the scanner control unit 324, the operation status of the printer 390 from the printer control unit 325, and the display status of the operation panel 360 from the display control unit 323.

Next, in S1802, the job control unit 330 determines, based on the collected statuses, whether an operation intended by the user indicated by the intent data is executable. For example, if the printer cannot operate for some reason (for example, lack of consumable material such as a sheet, or an existence of an uncompleted preceding job) even though the intent data includes an intent ID associated with a print job, it can be determined that the intended operation is not executable. If it is determined that the operation intended by the user is not executable, the process advances to S1803. Otherwise, if it is determined that the operation intended by the user is executable, the process advances to S1804.

In S1803, since the operation intended by the user is not executable, the job control unit 330 generates response text data for a response speech representing a situation that the operation is not executable. If, for example, it is intended to execute a copy job but the copy job is not executable, response text data of "Unable to execute copy job, presently" can be generated. Note that the generated response text data may include speech that reads the reason why the operation is not executable.

Meanwhile, in S1804, the job control unit 330 determines whether the intent identified by the intent ID in the intent data requires to refer to the history data. An intent requiring to refer to the history data may be an intent with an intent ID having a partial character string "History" or "Recommend" as indicated in FIG. 9, for example. If the intent data indicates an intent requiring to refer to the history data, the process advances to S1806. Otherwise, if the intent data indicates an intent not requiring to refer to the history data, the process advances to S1805.

In S1805, the job control unit 330 acquires setting values indicated by the intent data (and default values, as needed) for a new job without referring to the history data.

Meanwhile, in S1806, the job control unit 330 determines, based on entries in the intent data, whether a timing word, which is a keyword representing an execution timing of a job to be referred to, has been included in the input speech. For example, if the intent data includes the entity ID "Timing" as indicated in FIG. 12, it may be determined that a timing word has been included in the input speech. If a timing word has been included in the input speech, the process advances to S1807. Otherwise, If no timing word has been included in the input speech, the process advances to S1810.

In S1807, the job control unit 330 specifies, in the history data, an entry of a job in the past of which job type is the same as that of the new job and having job execution date and time that match the designated timing, within the scope of the same user (or the same group) as the user of the current interaction. Next, the job control unit 330 acquires setting values indicated by the specified entry of the history data as setting values for the new job. Then, the process advances to S1814.

Meanwhile, in S1810, the job control unit 330 specifies one or more entries of the history data of which job types are the same as that of the new job, within the scope of the same user (or the same group) as the user of the current interaction. Next, in S1811, the job control unit 330 calculates frequencies of values for each setting item from the specified entries. Next, in S1812, the job control unit 330 acquires, based on the calculation result, the most frequent setting value for each of the items that are allowed to be set from the history data. Then, the process advances to S1814.

In S1814, the job control unit 330 generates a response text data related to the setting values for the new job acquired in S1805, 1808 or S1812. For example, in a case where the input speech has included a keyword requesting an immediate execution of the new job, the response text data generated herein may include a text for speech which simply notifies the user that the execution of the new job is starting. On the other hand, if an immediate execution of the new job is not requested by the user, the response text data generated herein may include a text for speech which requests the user to confirm the contents of settings of the new job. If there remains a setting item out of setting items required for job execution of which setting value has not been designated, the response text data generated herein may include a text for speech which requests the user to input the setting value.

The job control unit 330 transmits the response text data generated in S1803 or S1814 described above to the speech recognition server 200 in S1708 of FIG. 17.

2-3. Various Speech Interaction Scenarios

FIGS. 19 to 23 are sequence diagrams showing examples of speech interactions under respective different scenarios according to the embodiments.

(1) First Scenario (No Reference to History Data)

Figure 19:
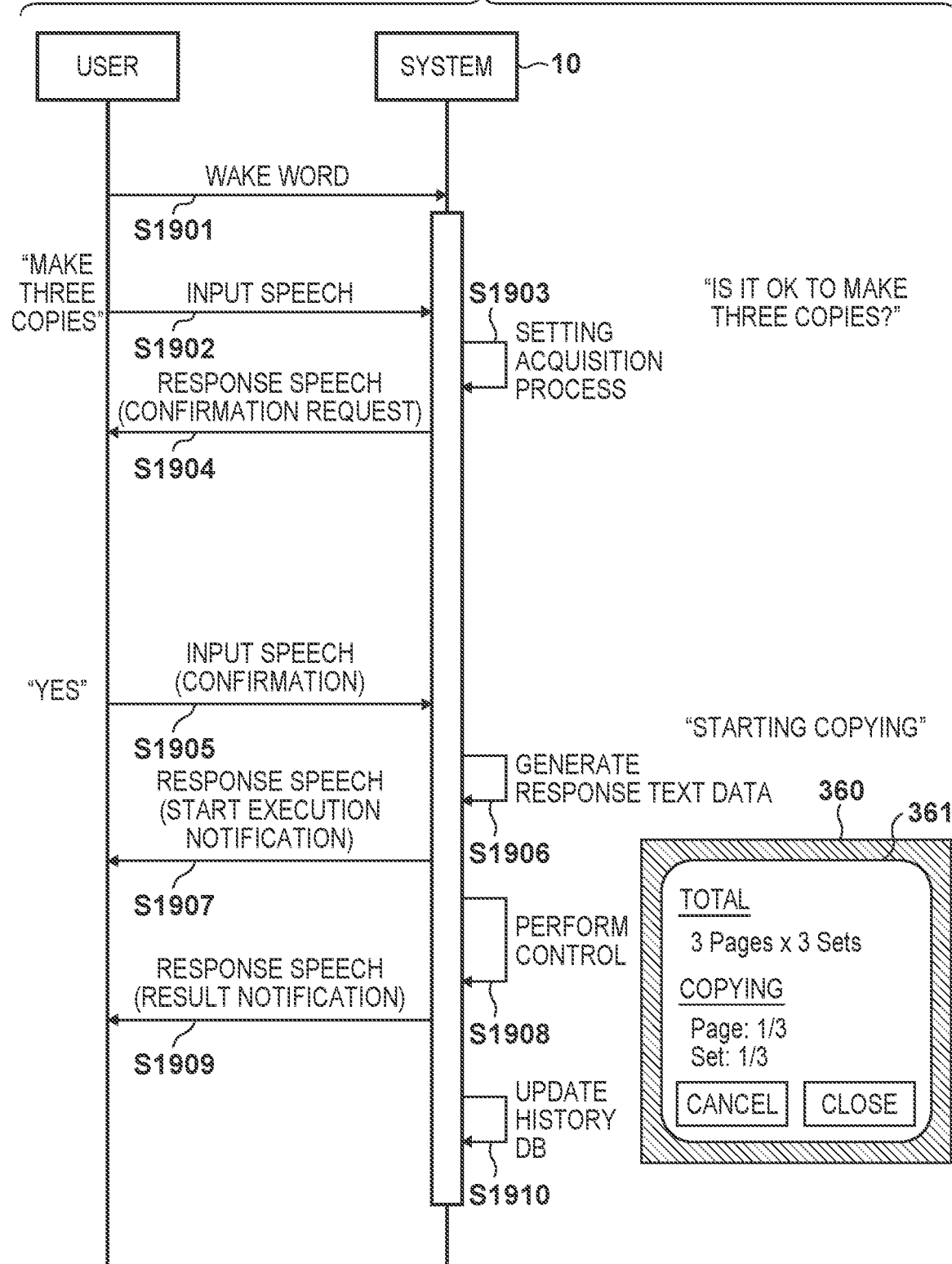
FIG. 19 is a sequence diagram showing an example of speech interaction under a first scenario.

In the first scenario in FIG. 19, since the user does not utter speech for requesting reference to the history data, the history data is not referred to for setting up a new job.

In S1901, the user utters the wake word to the speech control apparatus 100, and a speech interaction session starts upon detection of the wake word as a trigger. Following the wake word, the user utters, in S1902, speech of "Make three copies" representing contents of an operation to be desirably executed by the image processing apparatus 300. This speech is acquired as an input speech by the microphone 160 of the speech control apparatus 100, and undergoes speech recognition by the speech recognition server 200, and then intent data indicating a speech recognition result is provided to the image processing apparatus 300.

In S1903, in accordance with the user's intent indicated by the received intent data, the job control unit 330 of the image processing apparatus 300 executes the setting acquisition process described with reference to FIG. 18. In this example, since an intent requiring reference to the history data is not indicated, the job control unit 330 may acquire a setting value (for example, the number of prints "3" to be set) for a new copy job from the intent data. The job control unit 330 generates response text data that indicates contents of a response speech of "Is it OK to make three copies?" in order to request confirmation of the contents of settings. In S1904, the speech control apparatus 100 outputs the response speech from the speaker 170 using response speech data synthesized based on the response text data. After the output of the response speech, the speech interaction session is continued. Furthermore, the job control unit 330 temporarily holds the setting values of the unexecuted job.

Next, in S1905, the user who listens to the response speech utters speech of "Yes" to notify the system that there is no error in setting items which need to be confirmed. This speech is also acquired as an input speech by the microphone 160, and undergoes speech recognition by the speech recognition server 200, and then intent data indicating a speech recognition result is provided to the image processing apparatus 300.

In S1906, since it has been confirmed that there is no error in setting items, the job control unit 330 starts to execute the copy job. At this time, to notify the user of the start of execution of the designated job, the job control unit 330 generates, for example, response text data indicating contents of a response speech of "Starting copying". In S1907, the response speech of the contents indicated by the response text data is output from the speaker 170.

Furthermore, in S1908, the job control unit 330 executes control as desired by the user by setting the temporarily held setting values in the new copy job and outputting the copy job to the corresponding image processing unit. S1908 may be executed in parallel to S1907. Furthermore, the job control unit 330 displays, on the operation panel 360, an execution status screen 361 indicating the execution status of the job. The display contents of the execution status screen 361 can be updated, where appropriate, along with the progress of the job.

After that, if the execution of the copy job in the image processing apparatus 300 ends, the job control unit 330 generates, for example, response text data indicating contents of a response speech of "Finished copy execution" in order to notify the user of the end of the execution of the job. In S1909, the response speech of the contents indicated by the response text data is output from the speaker 170. In 1910, the job control unit 330 adds, to the history database 326, an entry indicative of the setting values that were set in the copy job of which execution ended.

(2) Second Scenario (Timing Designated)

Figure 20:
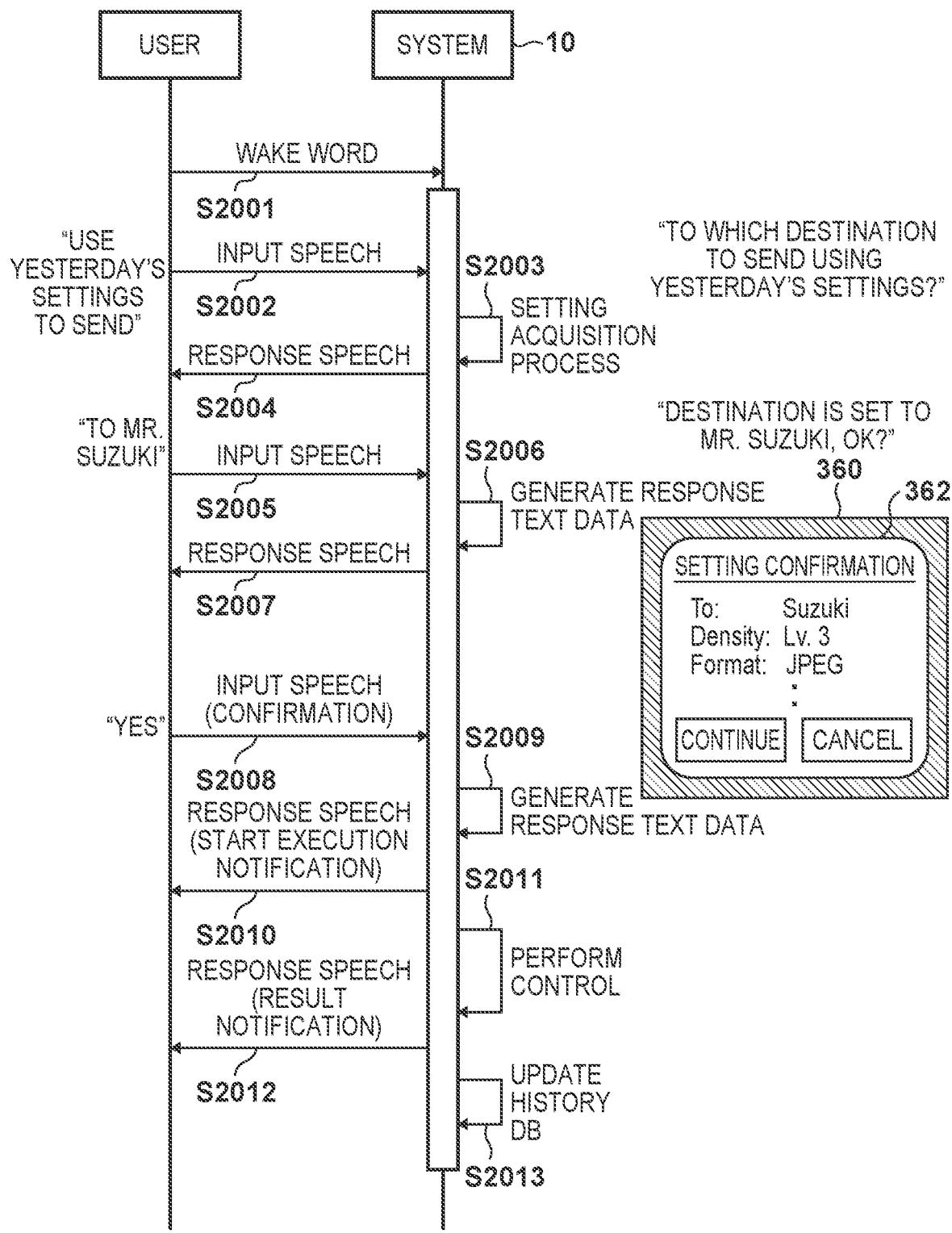
FIG. 20 is a sequence diagram showing an example of speech interaction under a second scenario.

In the second scenario in FIG. 20, the user utters speech for requesting reference to the history data, and thus the speech control system 10 acquires setting values to be set for a new job from the history database 326.

In S2001, the user utters the wake word to the speech control apparatus 100, and a speech interaction session starts upon detection of the wake word as a trigger. Following the wake word, the user utters, in S2002, speech of "Use yesterday's settings to send" representing contents of an operation to be desirably executed by the image processing apparatus 300. This speech is acquired as an input speech by the microphone 160 of the speech control apparatus 100, and undergoes speech recognition by the speech recognition server 200, and then intent data indicating a speech recognition result is provided to the image processing apparatus 300.

In S2003, in accordance with the user's intent indicated by the received intent data, the job control unit 330 of the image processing apparatus 300 executes the setting acquisition process described with reference to FIG. 18. The intent data received herein is similar data to the intent data 232. Since an intent "Send_history1" requiring reference to the history data is indicated for a new send job, the job control unit 330 refers to the history database 326 in order to acquire setting value for a new send job. More specifically, the intent data includes the entity {Timing}=timing_00001 which indicates an execution timing of a job to be referred to. Accordingly, the job control unit 330 specifies an entry of a send job issued by the same job issuer having a date and time one day ago in the history database 326. Then, the job control unit 330 acquires, from the specified entry, setting values of the setting items that are allowed to be set from the history data. The following Table 1 shows, as an example, setting values of a send job in bold letters that can be acquired from the history data in the present scenario.

TABLE 1

Acquisition of Setting Values from History Data in the First Scenario

| Setting Item (Send Job) | History Data (2019 Jul. 31) | | Setting Value for New Job (2019 Aug. 1) |
|---|---|---|---|
| scan_job_parameters | — | | — |
| destination | | | |
| name | Suzuki | | |
| mail_address | suzuki@ . . . | | |
| preview | False | -> | False |
| scan_density_level | 3 | -> | 3 |
| mail_contents | — | | — |
| subject | | | |
| Body | | | |
| image_file_format | Jpeg | -> | Jpeg |
| scan_sides | Both Sides | -> | Both Sides |
| scan_size | Auto | -> | Auto |
| ColorMode | Color | -> | Color |

Furthermore, since the name and mail address of the destination that are not allowed to be set from the history data cannot be acquired from the intent data, the job control unit 330 generates a response text data for requesting designation of the destination. In S2004, the speech control apparatus 100 outputs a response speech from the speaker 170 using response speech data synthesized based on the response text data. For example, a response speech of "To which destination to send using yesterday's settings?" may be output. After the output of the response speech, the speech interaction session is continued. Furthermore, the job control unit 330 temporarily holds the setting values of the unexecuted job.

Next, in S2005, the user who listens to the response speech utters speech of "To Mr. Suzuki" to designate the desired destination. This speech is also acquired as an input speech by the microphone 160, and undergoes speech recognition by the speech recognition server 200, and then intent data indicating a speech recognition result is provided to the image processing apparatus 300.

In S2006, the job control unit 330 recognizes that the destination should be set to "Mr. Suzuki", and generates response text data that indicates contents of a response speech of "Destination is set to Mr. Suzuki, OK?" in order to request confirmation of the contents of settings. In S2007, the response speech of the contents indicated by the response text data is output from the speaker 170. The job control unit 330 further displays, on the operation panel 360, a setting confirmation screen 362 concurrently with the output of the response speech. In the example in FIG. 20, the names and values of the setting values acquired for the new send job are listed in the setting confirmation screen 362. After the output of the response speech, the speech interaction session is continued. Furthermore, the job control unit 330 temporarily holds the setting values of the unexecuted job.

Because the subsequent interaction from S2008 to S2013 may be similar to that from S1905 to S1910 described with reference to FIG. 19, the descriptions thereof are herein omitted.

(3) Third Scenario (Reuse of Most Frequent Value, Immediate Execution)

Figure 21:
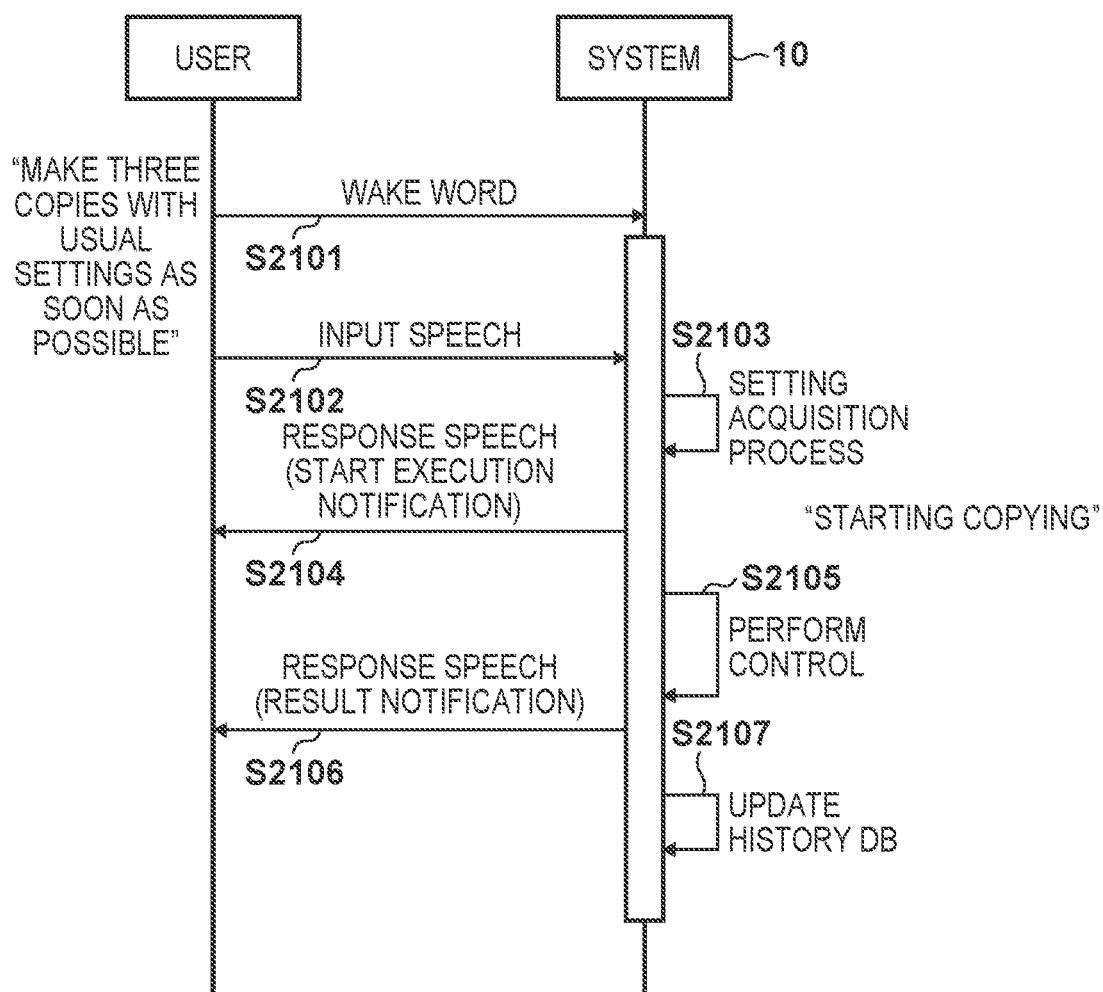
FIG. 21 is a sequence diagram showing an example of speech interaction under a third scenario.

In the third scenario in FIG. 21, the user utters speech for requesting reference to the history data, and thus the speech control system 10 acquires setting values to be set for a new job from the history database 326. Herein, the user designates no execution timing of jobs in the history data to be referred to, but instruct reuse of the most frequently utilized setting values, instead. The user also instructs an immediate execution of the new job.

In S2101, the user utters the wake word to the speech control apparatus 100, and a speech interaction session starts upon detection of the wake word as a trigger. Following the wake word, the user utters, in 52102, speech of "Make three copies with usual settings as soon as possible". This speech is acquired as an input speech by the microphone 160 of the speech control apparatus 100, and undergoes speech recognition by the speech recognition server 200, and then intent data indicating a speech recognition result is provided to the image processing apparatus 300.

In S2103, in accordance with the user's intent indicated by the received intent data, the job control unit 330 of the image processing apparatus 300 executes the setting acquisition process described with reference to FIG. 18. Since the keyword that instructs acquiring the most frequently utilized setting values for a new copy job ("usual") was uttered, the job control unit 330 specifies, in the history database 326, one or more entries of copy jobs issued by the same job issuer. The job control unit 330 calculates frequencies of setting values from the specified entries for each setting item that is allowed to be set from the history data. Then, the job control unit 330 sets, for the new copy job, the setting value that indicates the highest frequency in the calculation result for each setting item. The following Table 2 shows, as an example, setting values of a copy job in bold letters that can be acquired from the history data in the present scenario. Note that, since the user has explicitly uttered the value of the number of prints, the number of prints of the new copy job is set to the value "three" indicated by intent data (the setting value from the history data is overwritten and not used).

TABLE 2

Acquisition of Setting Values (Most Frequent Values)
from History Data in the Second Scenario

| Setting Item (Copy Job) | History Data (Most Frequent Values) | | Setting Value for New Job |
|---|---|---|---|
| scan_job_parameters | — | | — |
| destination | — | | — |
| name | — | | — |
| mail_address | — | | — |
| preview | — | | — |
| scan_density_level | — | | — |
| mail_contents | — | | — |
| subject | — | | — |
| Body | — | | — |
| image_file_format | — | | — |
| scan_sides | Both Sides | -> | Both Sides |
| scan_size | Auto | -> | Auto |
| ColorMode | Color | -> | Color |
| Print Job Parameters | — | | — |
| NomOfPrint | | | 3 |
| PaperSize | Both Sides | -> | Both Sides |
| Print_sides | Auto | -> | Auto |
| document_format | | | |
| ColorMode | | | |

In addition, in the present scenario, since the keyword that instructs an immediate execution of the job ("as soon as possible") was uttered, the job control unit 330 does not request the user to confirm the contents of settings before execution of the job. In the setting acquisition process at S2103, the job control unit 330 generates response text data indicating contents of a response speech to notify the user of the start of execution of the job. In S2104, the response speech of the contents indicated by the response text data is output from the speaker 170. In S2105, the job control unit 330 starts execution of the copy job.

Because the subsequent steps S2106 and S2107 may be similar to S1909 and S1910 described with reference to FIG. 19, the descriptions thereof are herein omitted.

(4) Fourth Scenario (Timing Designated, Change Occurs)

Figure 22:
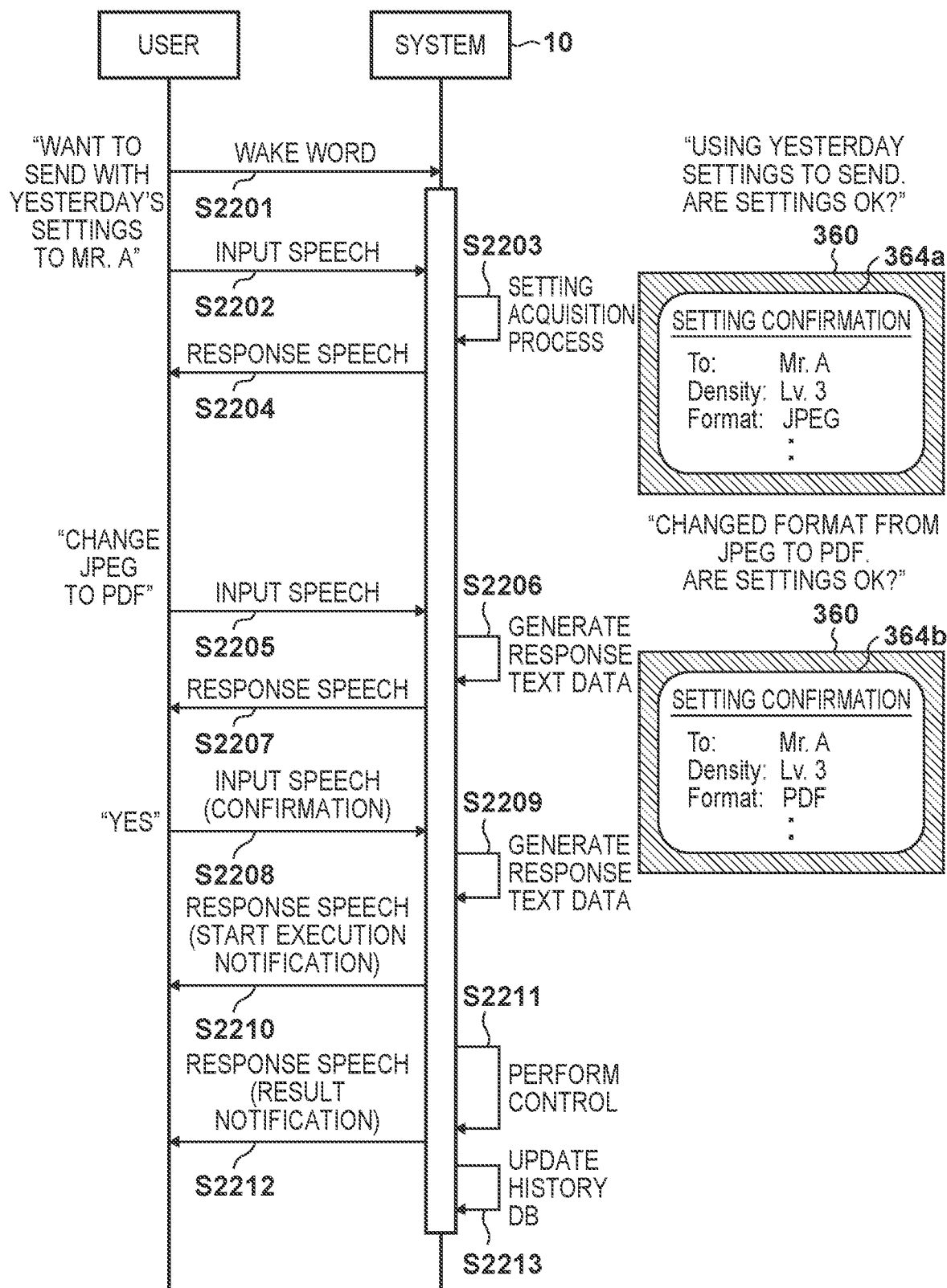
FIG. 22 is a sequence diagram showing an example of speech interaction under a fourth scenario.
Figure 23:
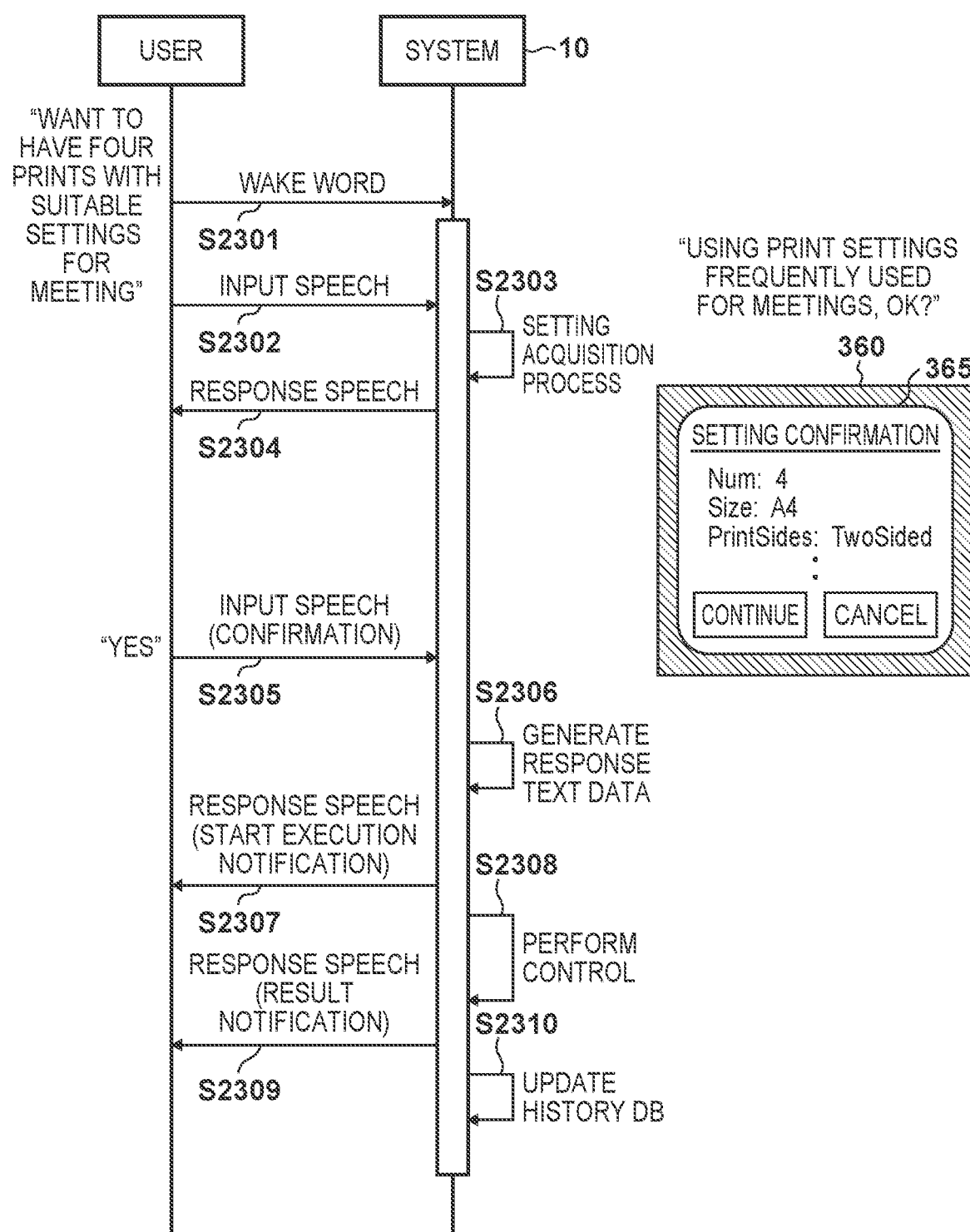
FIG. 23 is a sequence diagram showing an example of speech interaction under a fifth scenario.

In the fourth scenario in FIG. 22, the user utters speech for requesting reference to the history data, and thus the speech control system 10 acquires setting values to be set for a new job from the history database 326. One of the setting values acquired from the history database 326 is changed through a speech interaction with the user.

In S2201, the user utters the wake word to the speech control apparatus 100, and a speech interaction session starts upon detection of the wake word as a trigger. Following the wake word, the user utters, in 52202, speech of "Want to send with yesterday's settings to Mr. A". This speech is acquired as an input speech by the microphone 160 of the speech control apparatus 100, and undergoes speech recognition by the speech recognition server 200, and then intent data indicating a speech recognition result is provided to the image processing apparatus 300.

In S2203, in accordance with the user's intent indicated by the received intent data, the job control unit 330 of the image processing apparatus 300 executes the setting acquisition process described with reference to FIG. 18. Since an intent requiring reference to the history data is indicated for a new send job, the job control unit 330 refers to the history database 326 in order to acquire setting value for a new send job. More specifically, the received intent data includes the entity {Timing}=timing_00001 which indicates an execution timing of a job to be referred to. Accordingly, the job control unit 330 specifies an entry of a send job issued by the same job issuer having a date and time one day ago in the history database 326. Then, the job control unit 330 acquires, from the specified entry, setting values of the setting items that are allowed to be set from the history data. The setting values of the send job that may be initially acquired in the present scenario may be the same as those indicated by bold letters in Table 1. The job control unit 330 acquires, based on the intent data, setting values related to destination that are not allowed to be set from the history data.

In the setting acquisition process at S2203, the job control unit 330 generates response text data that indicates contents of a response speech of "Using yesterday settings to send. Are settings OK?" in order to request confirmation of the contents of settings. In S2204, the response speech of the contents indicated by the response text data is output from the speaker 170. The job control unit 330 further displays, on the operation panel 360, a setting confirmation screen 364a concurrently with the output of the response speech. After the output of the response speech, the speech interaction session is continued. Furthermore, the job control unit 330 temporarily holds the setting values of the unexecuted job.

In S2205, the user who listens to the response speech utters speech to instruct to change the image file format from JPEG to PDF. This speech is also acquired as an input speech by the microphone 160, and undergoes speech recognition by the speech recognition server 200, and then intent data indicating a speech recognition result is provided to the image processing apparatus 300.

In S2206, the job control unit 330 recognizes that the image file format should be changed from JPEG to PDF, and generates response text data that indicates contents of a response speech of "Changed format from JPEF to PDF. Are settings OK?" in order to request confirmation of the changed contents of settings. In S2207, the response speech of the contents indicated by the response text data is output from the speaker 170. The job control unit 330 further displays, on the operation panel 360, a setting confirmation screen 364b concurrently with the output of the response speech. After the output of the response speech, the speech interaction session is continued. Furthermore, the job control unit 330 temporarily holds the setting values of the unexecuted job.

Because the subsequent interaction from 52208 to 52213 may be similar to that from S1905 to S1910 described with reference to FIG. 19, the descriptions thereof are herein omitted.

(5) Fifth Scenario (Group-Based Reference, Reuse of Most Frequent Value)

In the above-described second to fourth scenarios, reference is made to the entries in the history data within the scope of the same user (that is, setting values are acquired for a new job from an entry of which job issuer is the same as the user involved in the interaction). In contrast, in the fifth scenario, reference is made to entries in the history data within the scope of a group to which the user belongs. Furthermore, the user instructs reuse of the most frequently utilized setting values.

In S2301, the user utters the wake word to the speech control apparatus 100, and a speech interaction session starts upon detection of the wake word as a trigger. Following the wake word, the user utters, in S2302, speech of "Want to have four prints with suitable settings for meeting". This speech is acquired as an input speech by the microphone 160 of the speech control apparatus 100, and undergoes speech recognition by the speech recognition server 200, and then intent data indicating a speech recognition result is provided to the image processing apparatus 300.

In S2303, in accordance with the user's intent indicated by the received intent data, the job control unit 330 of the image processing apparatus 300 executes the setting acquisition process described with reference to FIG. 18. The received intent data herein indicates an intent requiring reference to the history data for a new print job, and thus the job control unit 330 refers to the history database 326 in order to acquire setting value for the new print job. More specifically, in the present scenario, the received intent data represents an intent to refer to entries associated with the same group as the group to which the issuer user of the new job belongs. Accordingly, the job control unit 330 specifies, in the history database 326, one or more entries of print jobs having the same group ID as that of the group to which the job issuer belongs. The job control unit 330 calculates frequencies of setting values from the specified entries for each setting item that is allowed to be set from the history data. Then, the job control unit 330 sets, for the new print job, the setting value that indicates the highest frequency in the calculation result for each setting item. The following Table 3 shows, as an example, setting values of a print job in bold letters that can be acquired from the history data in the present scenario. Note that, since the user has explicitly uttered the value of the number of prints, the number of prints of the new print job is set to the value "four" indicated by intent data (the setting value from the history data is overwritten and not used).

TABLE 3

Group-based Acquisition of Setting Values (Most Frequent Values) from History Data in the Fifth Second Scenario

| Setting Item (Print Job) | History Data (Most Frequent Values) | | Setting Value for New Job |
|---|---|---|---|
| Print Job Parameters | — | | — |
| NomOfPrint | | | 4 |
| PaperSize | TwoSided | −> | TwoSided |
| Print_sides | Auto | −> | Auto |
| document_format | HTML | | HTML |
| ColorMode | Auto | −> | Auto |

In the example of Table 3, since the target document data for the new print job is HTML data, the job control unit 330 preferentially refers to entries in the history data of which document formats are "HTML". Preferential reference may include, for example, referring only to entries of which document formats are "HTML" when such entries exist, and referring to another entry when there are no such entries. Alternatively, preferential reference may include assigning larger weights to entries of "HTML" and smaller weights to the other entries to calculate frequencies in a weighted manner.

In the setting acquisition process at S2303, the job control unit 330 generates response text data that indicates contents of a response speech of "Using print settings frequently used for meeting, OK?" in order to request confirmation of the contents of settings. In S2304, the response speech of the contents indicated by the response text data is output from the speaker 170. The job control unit 330 further displays, on the operation panel 360, a setting confirmation screen 365 concurrently with the output of the response speech. After the output of the response speech, the speech interaction session is continued. Furthermore, the job control unit 330 temporarily holds the setting values of the unexecuted job.

Because the subsequent interaction from 52305 to 52310 may be similar to that from S1905 to S1910 described with reference to FIG. 19, the descriptions thereof are herein omitted.

3. Modifications

The present invention is not limited to the above-described embodiments, and various modifications can be made. In one modification, the job control unit 330 may cause the speaker 170 to output a response speech that reads setting values acquired from the history data, instead of having the user confirm the setting values acquired from the history data on a setting confirmation screen.

The above-described scenarios may be combined in any combination. For example, the group-based reference to the history data may be performed for any type of intent. An instruction for immediate job execution may be added to any type of intent.

Two or more apparatuses that have been described as physically separate apparatuses in this specification may be combined in any fashion. A plurality of functions described as those of a single apparatus may be distributed to physically separate apparatuses. For example, the speech recognition function and speech synthesis function of the speech recognition server 200 may be integrated in the speech control apparatus 100 or the image processing apparatus 300.

Furthermore, the function of acquiring setting values of jobs in the past from history data based on a result of speech recognition may be integrated in the speech control apparatus 100 or the speech recognition server 200. The image processing apparatus 300 may have the speech control function of the speech control apparatus 100 together with the microphone and the speaker. Moreover, the history database may be implemented in an independent data server, or may be integrated in the speech recognition server 200. In that case, histories of job executions in a plurality of image processing apparatus 300 may be retained in a common history database and may be made available for reference across apparatuses.

4. Summary

The embodiments of the present disclosure have been described above in detail with reference to FIGS. 1 to 23. In the above-described embodiments, there is provided a speech control system including a microphone configured to acquire speech and an image processing unit, the speech control system further including a database configured to retain history data of one or more jobs executed by the image processing unit, and a controller configured to control settings of the image processing unit. The history data indicates at least one setting value that was set in each job. The controller is configured to acquire, by referring to the history data based on a result of speech recognition on an input speech of a user acquired by the microphone, a setting value to be set for a new job of the image processing unit. With this configuration, the user can invoke and use a set of settings that are convenient to the user from the history data via a speech UI without a need to assign a specific key to the set of settings in advance for future use. In this way, a burden on a user related to settings of a multifunctional machine is mitigated.

In the above-described embodiments, an entry to be referred to in the history data may be specified based on a keyword that is indicated by the result of speech recognition and represents an execution timing of a job to be referred to. With this configuration, the user can invoke, from the history data, a set of settings that was used in the past by designating a timing such as a date or time by speech, for example. It will also be possible for the user to flexibly invoke, via the speech UI, a desired set out of different sets of settings that were used at different timings in the past.

In the above-described embodiments, one or more entries in the history data may be referred to based on a keyword indicated by the result of speech recognition for acquiring a most frequently utilized setting value, and the most frequently utilized setting value may be acquired from those one or more entries. With this configuration, the user can invoke a set of settings that is often used in normal times with a short speech, instead of uttering a particular timing or setting value.

In the above-described embodiments, it may be determined, based on the result of speech recognition, whether to refer only to an entry associated with the user in the history data, or to refer also to an entry associated with another user. With this configuration, the user can easily invoke and use a useful set of settings that have been used by another user without a need to perform an extra operation such as assigning a key in advance. This will also facilitate sharing a set of settings recommended in a group among a plurality of users within the same group.

In the above-described embodiments, setting items that are allowed to be set from the history data may be predefined for a job that is executable by the image processing unit, and setting values of those allowed setting items may be acquired by referring to the history data. With this configuration, it can be ensured to exclude, from reused items, setting items of which reuse from history data is inadequate because of information security, characteristics of the settings and so on. For the setting items excluded from the reused items, the user may be requested to input setting values (for example, with a speech input) so that required setting values of a job can be supplemented.

In the above-described embodiments, it may be determined, based on the result of speech recognition, whether to request a user to confirm contents of settings before causing the image processing unit to execute the new job with the setting value acquired by referring to the history data. With this configuration, it is possible to immediately execute a job so as not to make a speech interaction redundant when the user wants to quickly execute the job with setting values acquired from the history data.

5. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-209827, filed on Nov. 20, 2019 which is hereby incorporated by reference herein in its entirety.

What is claimed is:

1. An image processing system comprising:
an image processing device;
a database in which information of jobs executed by the image processing device is retained;
a receiving unit configured to receive input data that represents a user's intent and includes one or more words;
an acquiring unit configured to determine, based at least on a first specific word included in the input data received by the receiving unit, whether to refer to the database, and to acquire, when it is determined to refer to the database, one or more setting values from the database using an extraction condition corresponding to a second specific word that is included in the input data received by the receiving unit, and
a setting unit configured to set up a new job to be executed by the image processing device based on the one or more setting values,
wherein a setting item that is allowed to be set from the database is predefined for a job that is executable by the image processing device, and
the acquiring unit is configured to acquire, from the database, a setting value of the setting item that is allowed to be set from the database.

2. The image processing system according to claim 1, wherein the acquiring unit is configured to, when the second specific word representing an execution timing of a job to be referred to is included in the input data, refer to an entry in the database having job execution date and time that match the execution timing represented by the second specific word.

3. The image processing system according to claim 1, wherein the second specific word is a keyword for acquiring a most frequently utilized setting value.

4. The image processing system according to claim 1, wherein the input data is a result of speech recognition on a speech that the user has uttered, and
the acquiring unit is configured to determine, based on the input data, whether to refer only to an entry in the database associated with the user who has uttered the speech, or to refer also to an entry associated with another user who has not uttered the speech.

5. The image processing system according to claim 1, further comprising:
a speaker that is capable of outputting speech;
wherein the acquiring unit is configured to cause the speaker to output response speech for requesting an input of a setting value in a case where the setting value of a setting item that is not allowed to be set from the database cannot be acquired from the input data.

6. The image processing system according to claim 1, further comprising a determination unit configured to determine, based on the input data, whether to request the user to confirm contents of settings before causing the image processing device to execute the new job, the contents of settings being based on the one or more setting values from the database.

7. The image processing system according to claim 1, further comprising:
a microphone that is capable of acquiring speech,
wherein the input data is a result of speech recognition on the speech acquired by the microphone.

8. The image processing system according to claim 1, wherein the image processing device has at least one of an image forming function of forming an image on a sheet and an original reading function of reading an original to generate image data.

9. The image processing system according to claim 1, wherein the new job is a job that requires a destination to be set, and
the setting unit is configured not to set a destination in the new job based on the one or more setting values.

10. The image processing system according to claim 9, wherein the destination can be set through a speech input after the setting unit set up the new job based on the one or more setting values.

11. The image processing system according to claim 1, wherein the new job is a job that requires a destination to be set, and
in a case where the input data includes a word for the destination, the setting unit is configured to set up the new job based on the one or more setting values, and set the destination in the new job.

12. A setting control method of controlling settings of an image processing device, comprising:
retaining, in a database, information of jobs executed by the image processing device;
receiving input data that represents a user's intent and includes one or more words;
determining, based at least on a first specific word included in the input data, whether to refer to the database,
acquiring, when it is determined to refer to the database, one or more setting values from the database using an extraction condition corresponding to a second specific word that is included in the input data,
setting up a new job to be executed by the image processing device based on the one or more setting values,
wherein a setting item that is allowed to be set from the database is predefined for a job that is executable by the image processing device, and
the one or more setting values acquired from the database includes a setting value of the setting item that is allowed to be set from the database.

13. An image processing apparatus comprising:
an image processing device; and
a controller for controlling settings of the image processing device;
wherein the controller is configured to
retain, in a database, information of jobs executed by the image processing device;
receiving input data that represents a user's intent and includes one or more words;
determine, based at least on a first specific word included in the input data, whether to refer to the database,
acquire, when it is determined to refer to the database, one or more setting values from the database using an extraction condition corresponding to a second specific word that is included in the input data, and
set up a new job to be executed by the image processing device based on the one or more setting values,
wherein a setting item that is allowed to be set from the database is predefined for a job that is executable by the image processing device, and
the one or more setting values acquired from the database includes a setting value of the setting item that is allowed to be set from the database.

14. A non-transitory computer-readable storage medium storing a computer program for causing a processor of an image processing apparatus including an image processing device to operate as a control unit for controlling settings of the image processing device, wherein the control unit is configured to retain, in a database, information of jobs executed by the image processing device;

receiving input data that represents a user's intent and includes one or more words;

determine, based at least on a first specific word included in the input data, whether to refer to the database, acquire, when it is determined to refer to the database, one or more setting values from the database using an extraction condition corresponding to a second specific word that is included in the input data, and set up a new job to be executed by the image processing device based on the one or more setting values, wherein a setting item that is allowed to be set from the database is predefined for a job that is executable by the image processing device, and the one or more setting values acquired from the database includes a setting value of the setting item that is allowed to be set from the database.

* * * * *